United States Patent [19]

Sugishima et al.

[11] Patent Number: 4,797,706
[45] Date of Patent: Jan. 10, 1989

[54] MULTI-UNIT IMAGE PROCESSING SYSTEM WITH CENTRAL CONTROL

[75] Inventors: Kiyohisa Sugishima, Yokohama; Masanori Yamada, Kawasaki, both of Japan

[73] Assignee: Canon Kabushiki Kaisha, Tokyo, Japan

[21] Appl. No.: 832,536

[22] Filed: Feb. 24, 1986

[30] Foreign Application Priority Data

Feb. 28, 1985 [JP] Japan .............................. 60-039043
Feb. 28, 1985 [JP] Japan .............................. 60-039045

[51] Int. Cl.⁴ .................... G03G 15/00; H04N 1/00
[52] U.S. Cl. ................................. 355/14 R; 358/256
[58] Field of Search ............... 355/3 R, 14 R, 14 C, 355/14 SH; 358/256, 258, 296; 346/153.1, 160

[56] References Cited

U.S. PATENT DOCUMENTS

| | | | |
|---|---|---|---|
| 4,213,694 | 7/1980 | Kuseski | 355/14 C X |
| 4,383,277 | 5/1983 | Kubo | 358/256 X |
| 4,476,486 | 10/1984 | Ayata et al. | 358/78 |
| 4,527,885 | 7/1985 | Ayata et al. | 355/3 R |
| 4,530,593 | 7/1985 | Kasaya et al. | 355/14 SH X |
| 4,587,536 | 5/1986 | Saito et al. | 346/160 |
| 4,591,884 | 5/1986 | Miyamoto et al. | 346/153.1 |

Primary Examiner—Arthur T. Grimley
Assistant Examiner—J. Pendegrass
Attorney, Agent, or Firm—Fitzpatrick, Cella, Harper & Scinto

[57] ABSTRACT

An image processing system has readers for reading original images, a multi input/multi output unit, and printers with or without sorters. Image signals from one or more readers are output by printers selected by the multi input/multi output unit in accordance with the number of copies to be produced and the copy mode selected by the operator. High-speed copy operation can be performed by using available printers in the multi/single copy mode and/or sort/non-sort/group mode without requiring complex operation by the operator.

20 Claims, 41 Drawing Sheets

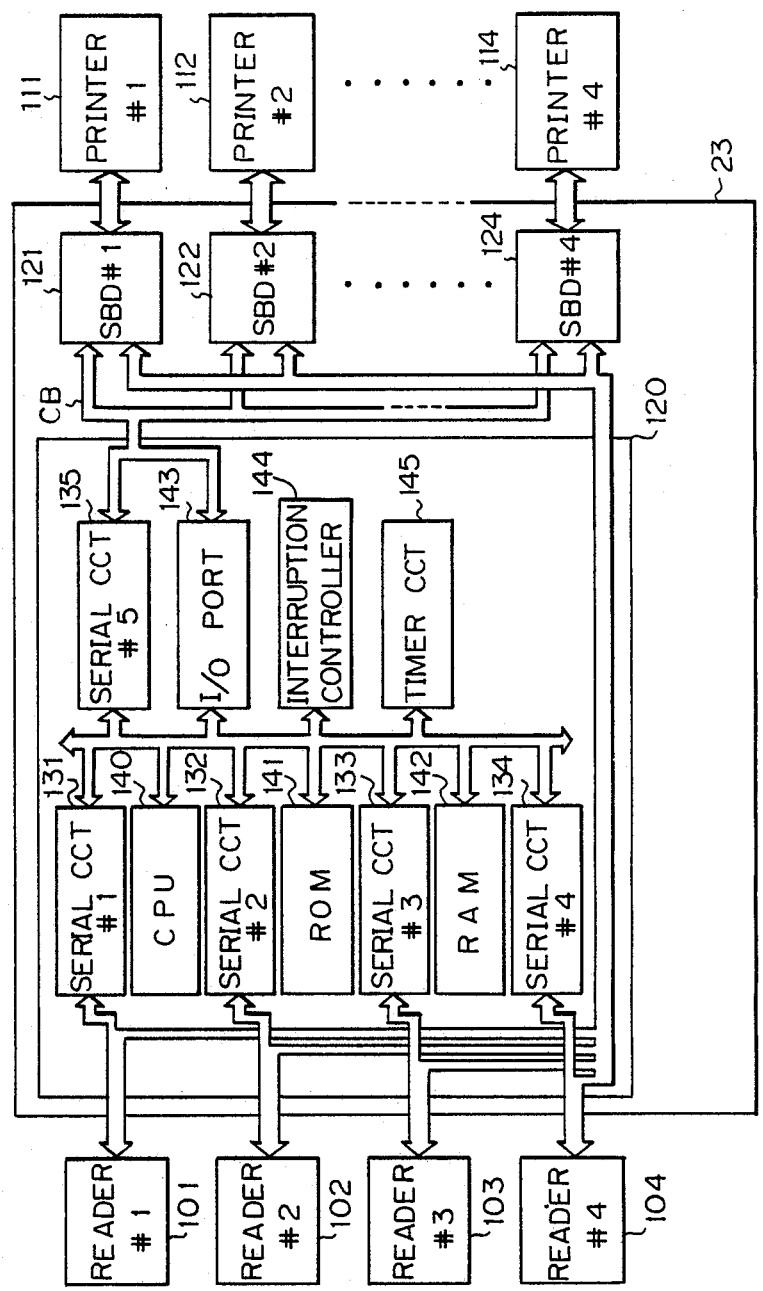

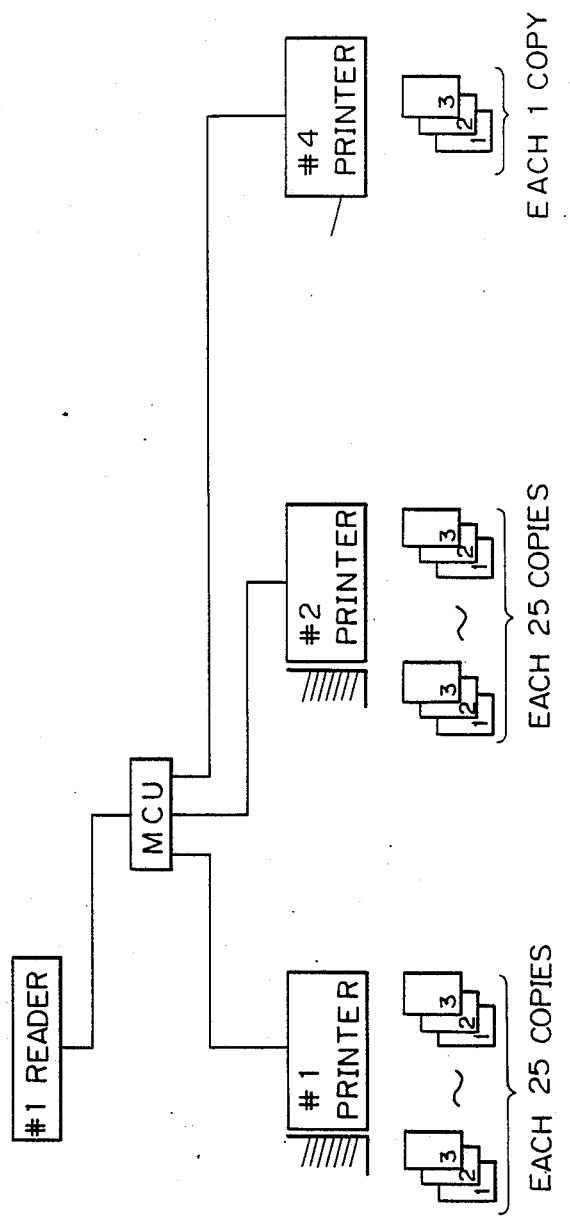

Fig. 10-2

(8) | H1 Q  START  OR  CHECK          (#2)  (ETC) |
    [CK1]  [CK2]  [CK3]  [CK4]  [CK5]  [CK6]
                                    ▲      ▲

(9) | C97  CLOSE  PRINTER  DOOR |
    [CK1]  [CK2]  [CK3]  [CK4]  [CK5]  [CK6]
                          ↓ 5sec
                         (8)

(10) | H1Q  START  OR  CHECK         (#4)  (ETC) |
    [CK1]  [CK2]  [CK3]  [CK4]  [CK5]  [CK6]
                                    ▲      ▲

(11) | C08  PRINTER  IS  BUSY |
    [CK1]  [CK2]  [CK3]  [CK4]  [CK5]  [CK6]
                          ↓ 5sec
                         (10)

(12) | H1Q  START  OR  CHECK         (#4) |
    [CK1]  [CK2]  [CK3]  [CK4]  [CK5]  [CK6]

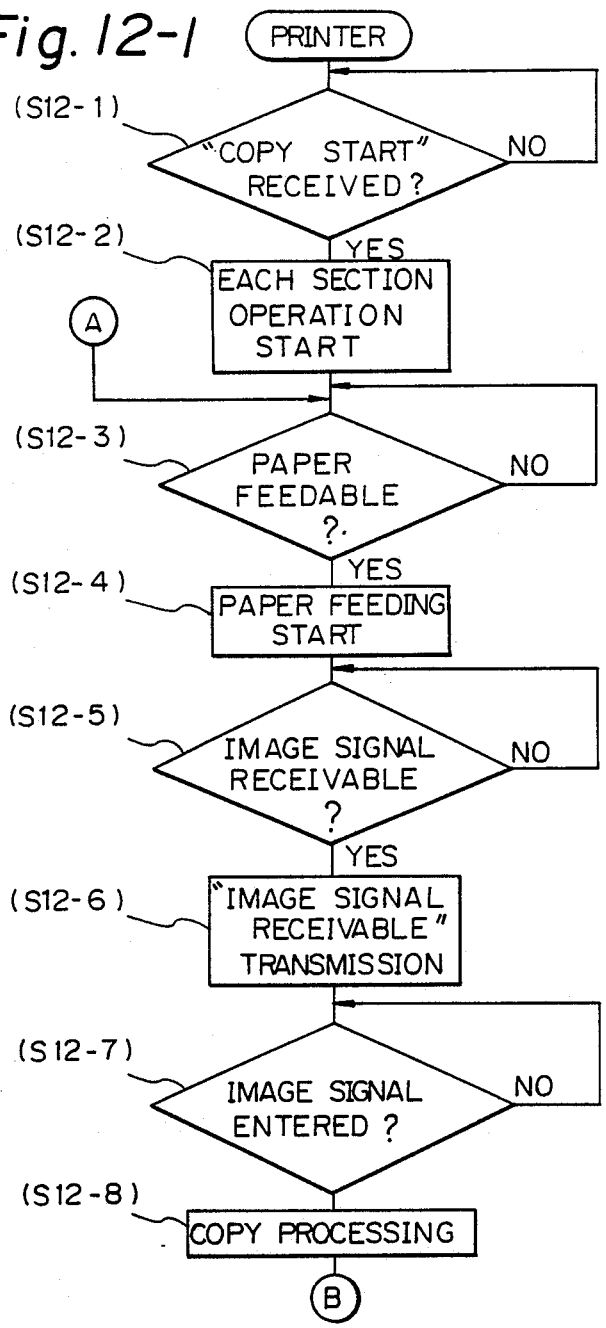

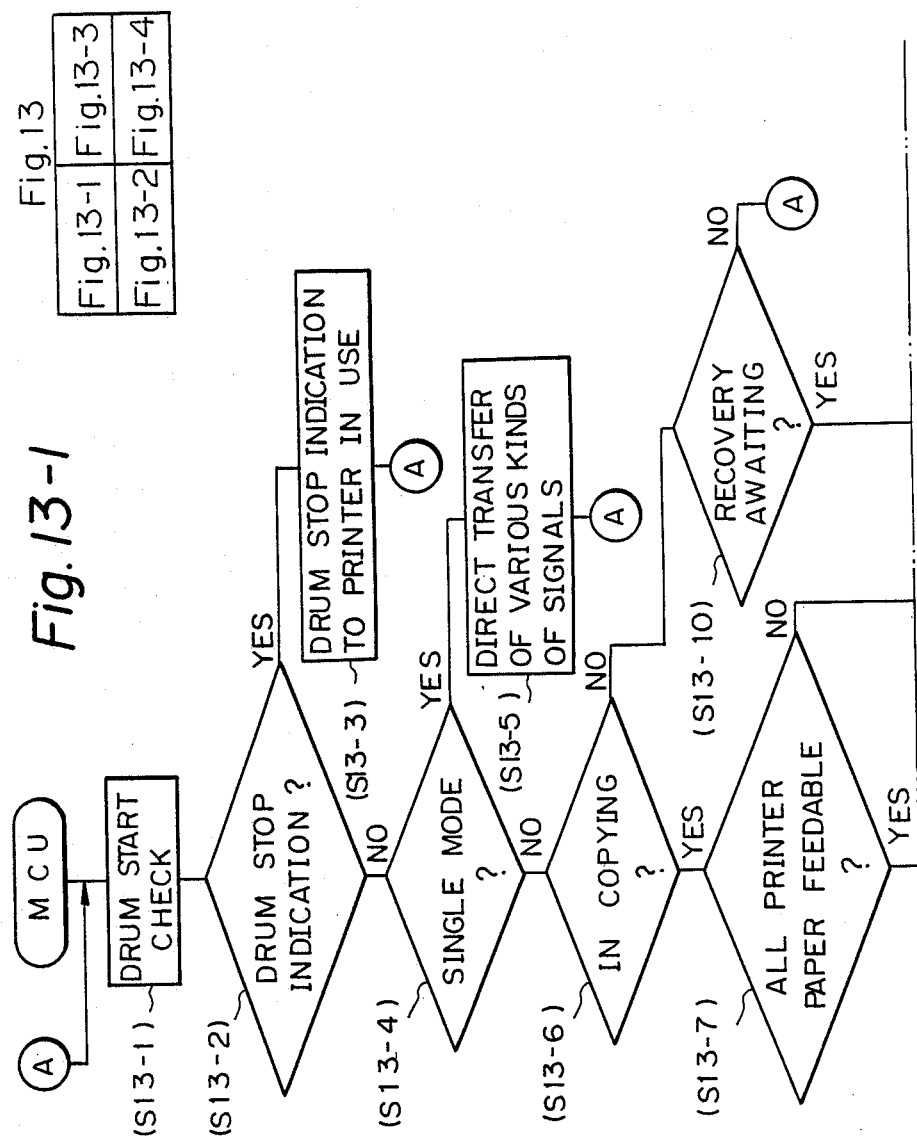

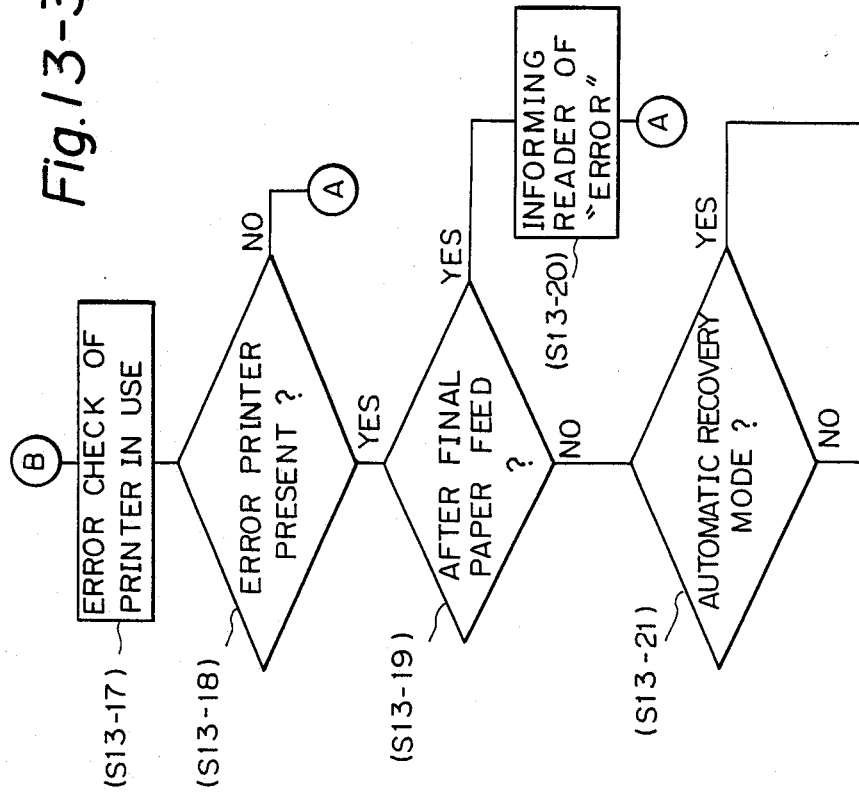

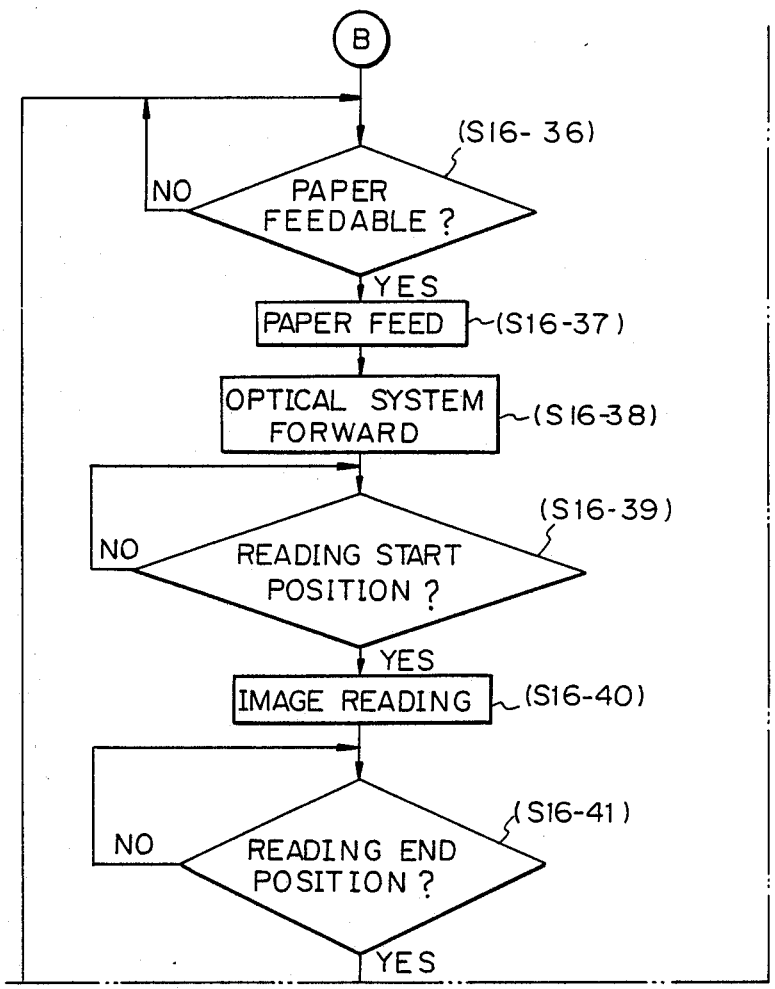

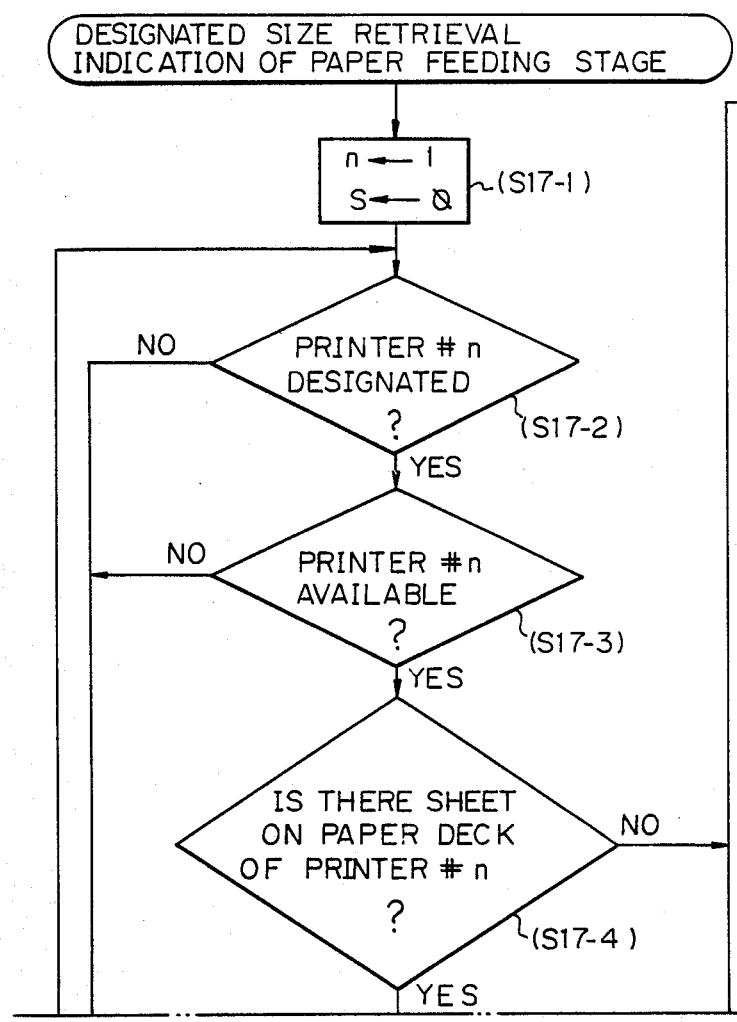

MULTI-UNIT IMAGE PROCESSING SYSTEM WITH CENTRAL CONTROL

BACKGROUND OF THE INVENTION

1. Field of the Invention

The present invention relates to an image processing system and, more particularly, to an image processing system which performs image processing such as image formation based on an image signal output from an image reader.

2. Related Background Art

Various techniques have been proposed for image processing such as image formation based on an image signal obtained by photoelectrically reading an image. In most such techniques, the output unit which outputs the image signal and the image forming unit have a one-to-one correspondence. A technique may be proposed to form images at a plurality of image forming units based on an image signal output from a single output unit. However, this cannot be satisfactorily performed by simple electrical connections. That is, proper control and display must be performed. In addition, the operation procedure may become complex, which is a problem to the user.

When a plurality of images are formed at a plurality of image forming units, a required number of images can be formed within a time period far shorter than that required for a single image forming unit. However, when a number of images obtained by dividing a total number of images to be formed by the number of available image forming units is assigned to each image forming unit, if the respective image forming units have different functions and the like, the total image forming time is not effectively shortened.

If a plurality of image forming units constituting an image processing system have different functions (e.g., both or two-side copying print speed, collation function and the like), the operator must select and operate only those units which are suitable for the desired image formation mode.

When a plurality of images are formed by a plurality of image forming units, the total image formation time can be reduced, as compared to that required for a signal image forming unit which is to form the same number of images. Before, the operator starts any copy operation, he selects the proper image forming units and estimates the image formation time. In this connection, if one or more units selected by the operator have failed and cannot serve, the load assigned to the failed unit may be automatically assigned to another unit. When this technique is adopted, however, the resultant image formation time may be often prolonged beyond the initial time estimation. In addition, in some special image formation modes, such automatic reassignment may result in some problems.

SUMMARY OF THE INVENTION

The present invention has been made in consideration of this, and has as its object to provide an image processing system which can perform effective image processing.

It is another object of the present invention to provide an image processing system which can form images at high speed.

It is still another object of the present invention to provide an image processing system which can be suitably adapted for image processing in various modes.

It is still another object of the present invention to provide an image processing system which can suitably control formation of a plurality of images and which has functions allowing easy operation by the operator.

It is still another object of the present invention to provide an image processing system which is suitably adapted for copying operation for reproducing images corresponding to original images on recording paper.

According to the present invention, the foregoing objects are achieved by providing an image processing system having means for discriminating whether or not an entered number of imates to be formed can be done by a selected one or more of several image forming units. For example, if the units each have a predetermined sorting capacity, and the copies are to be sorted, it may be discriminated whether or not the entered number of copies can in fact be sorted by the total sorting capacity of the chosen units.

According to another aspect of the invention, these objects are achieved by means of an image processing system in which, when a particular image forming unit is unavailable in the course of simultaneous image formation by several such units, another image forming unit may be designated in place of the one which is unavailable, or instead may be inhibited, in accordance with a selected image formation mode.

According to another aspect of the invention, these objects are achieved by providing an image forming system operable in at least two modes, such that in the first mode, image formation is inhibited if all of a designated set of image forming means are unavailable, while in the second mode, if at least one of the image forming means is available, image formation is allowed to proceed.

The above and other objects, features and advantages of the present invention will become apparent from the following detailed description when taken in conjunction with the accompanying drawings.

BRIEF DESCRIPTION OF THE DRAWINGS

FIGS. 9-1, 9-2 and 9-3 are illustrations for explaining assignment of the number of copies to be produced in respective printers in the multi unit mode;

FIGS. 10-1, 10-2, 11-1 and 11-2 are diagrams showing display states of communication display at the reader;

FIGS. 12-1 and 12-2 constitute a flow chart of a microcomputer of a printer;

FIGS. 15-1 and 15-2 are diagrams showing paper sizes of the reader in the multi unit mode; and FIG. 16-1, consisting of FIGS. 16-1-1, 16-1-2, 16-1-3 and 16-1-4, and FIG. 16-2, consisting of FIGS. 16-2-1, 16-2-2, 16-2-3, 16-2-4, 16-2-5, 16-2-6, 16-2-7 and 16-2-8 are flow charts of the microcomputer of the reader.

DETAILED DESCRIPTION OF THE PREFERRED EMBODIMENT

The preferred embodiment of the present invention will be described in detail with reference to the accompanying drawings.

Figure 1:
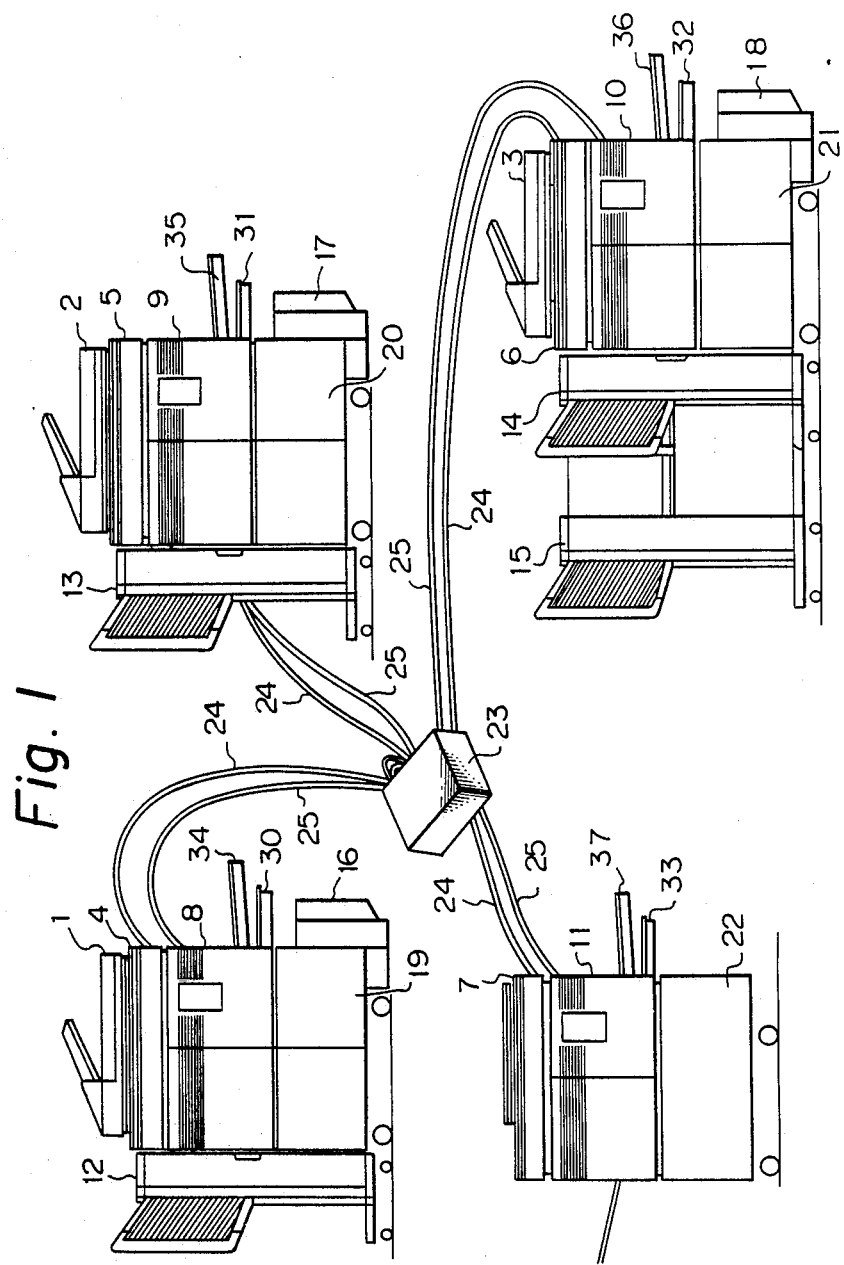
FIG. 1 ia a view showing the outer appearance of an image processing system according to the present invention.

FIG. 1 shows the outer appearance of an image processing system according to the present invention.

Original readers (to be referred to as readers #1 to #4 hereinafter) 4, 5, 6 and 7 for outputting original images as electrical read signals are connected to a multi-input/multi-output unit (to be referred to as an MCU hereinafter) 23 through signal lines 24. Printers 8, 9, 10 and 11 for recording on a recording medium such as paper are also connected to the MCU 23. For the sake of descriptive convenience, the printers 8 to 11 will be referred to as printers #1 to #4.

Original feeders (to be referred to as RFs hereinafter) 1, 2 and 3 feed originals on the platens of the corresponding readers one by one and are connected to the corresponding readers through signal lines (not shown) for transmitting various control signals. Collators (to be referred to as sorters hereinafter) 12, 13, 14 and 15 sort printed sheets exhausted from the corresponding printers. Each sorter 12, 13, 14 and 15 has 25 sorting bins. The two sorters 14 and 15 are connected to the printer 10 through a convey unit and together operate as a sorter having 50 bins. The sorters and printers are connected by control lines (not shown) for transferring various control signals. Upper cassettes 34, 35, 36 and 37 can store up to 250 sheets. Lower cassettes 30, 31, 32 and 33 can store up to 500 sheets.

Paper decks 16, 17 and 18 can store 2,000 sheets of paper.

Convey sections 19, 20 and 21 for two-sided copying form images on two sides of an identical sheet. A table 22 supports each printer.

The internal construction of the reader will be described in detail with reference to FIG. 2.

An original 202 is pressed by an original cover (or RF) 210 and placed on a platen 201 of glass or the like. A CCD sensor 203 consisting of a plurality of light-receiving elements aligned in line is used to read image information from the original 202. Illumination light from a light source 204 is reflected by the original 202 and the reflected light becomes incident on the sensor 203 through mirrors 205, 206, and 207 and a lens 208. The light source 204 and the mirror 205, and the mirrors 206 and 207 reciprocate at a relative speed of 2:1 on a rail 210 in order to scan the entire length of the original 202. A light source unit consisting of the mirrors 205, 206 and 207 and the light source 204 is moved at a constant speed by PLL control by a DC servo motor 209. In the forward path (from the left to right in FIG. 2), the moving speed is variable in a range of 90 mm/sec to 360 mm/sec in accordance with a reading rate. In the reverse path (from the right to left in FIG. 2), the moving speed is always 630 mm/sec.

The moving direction of the optical unit is called the subscanning direction, and a direction perpendicular thereto is called the main scanning direction. A plurality of light-receiving elements of the sensor 203 are aligned in the main scanning direction. The sensor 203 reads each main scanning line at a resolution of about 400 dots/inch while the optical unit is moved from the left to the right end. Thereafter, the optical unit is returned to the left end, to complete one scanning operation. An image read by the CCD sensor 203 is serially supplied to the MCU 23 as a digital signal of "1" or "0". The conversion and communication schemes of the digital signals are known and are not described herein.

The movement of an original and recording sheets in the copy operation will be described with reference to FIG. 3. The movement of an original when two-sided copy for forming images on both sides of a sheet will first be described. The operator first places one or more both copy originals 600 on an original table 611 of the RF 2. When the operator depresses the start key in the control section of the reader 5, the reader 5 supplies an original feed command to the RF 2. The RF 2 separates the lowermost original on the table 611 by a separation belt 612, and conveys the separated original onto a platen 201 by convey rollers 613 and a conveyor belt 614 through a convey section. In this state, the first side of the original is read a designated number of times. Thereafter, the belt 614 is rotated in the reverse direction, and the original on the platen 201 is fed toward convey rollers 618. When the trailing edge of the original passes by a deflection cam 616, the rollers 618 temporarily stop. The rollers 618 are rotated in the reverse direction, and the original is then fed toward a convey roller 620 by the deflection cam 616. The convey roller 620 performs the rotation direction reversal operation as in the rollers 618 and feeds the original toward the belt 614 by a deflection cam 617. Upon this operation, the original has been reversed and placed on the platen 201. The second side of the original is read a designated number of times. The conveyor belt 614 is rotated in the reverse direction, and the original is moved and exhausted toward the convey rollers 620 and 619 by the deflection cam 615. In this operation, the original is stopped at a predetermined position on the platen 201 by means of a timing pulse generator which generates a pulse in synchronism with a paper sensor (not shown) mounted on the paper path and a roller drive system.

When the original is placed on the platen 201, the reader 5 reads the first side of the original a required number of times and outputs an image signal while performing timing match control with the MCU and printer through signal lines.

When image read is completed, the original is reversed in the process described above. The second side of the original is read and an image signal is output in the same manner as for the first side. When reading of both sides of the first original is completed, the reader 5 instructs the RF 2 to exhaust the first original. In response to this command, the RF 2 feeds the original to the rollers 620 and 619 by the belt 614 and the cam 615. The original is exhausted by the convey rollers 619 and is stacked on the originals 600 on the table 611. When the copy operation of the first original is started, a short bar (not shown) is placed on the originals 600 remaining on the table 611, so that the last original to be copied can be determined later. When the start key is depressed once, the reader 5 performs the above operation for all the originals 600 placed on the table 611.

The movement of the recording sheets will be described in connection with the operation of the printer.

When printing of an image of the first side of the first original in the two-sided copy mode is instructed from the reader 5 by communication therewith, the printer 9 drives the respective rotational sections and high-voltage sections thereof and prepares for the printing operation. When the predetermined preparation operation is completed, in response to a paper feed start signal from the reader 5, the printer 9 starts feeding a recording sheet from a designated cassette (one of an upper cassette 633, a lower cassette 632, and the paper deck 17). When the sheet reaches registration rollers 633, it is temporarily stopped. The sheet is fed again by the registration rollers 633 synchronously with formation of an electrostatic latent image on a photosensitive drum 504 by a laser beam modulated by an image signal from the reader and generated by a laser generator 638.

In accordance with the conventional electrophotographic method, the latent image on the drum 514 is developed, and the toner image obtained is transferred onto the sheet designated from the designated cassette. The sheet is conveyed by a convey unit 634 and the image thereon is fixed by a fixing unit 635. In this manner, the image is formed on the first side of the sheet. The sheet having an image on its first side is conveyed to a duplex unit 20 by a deflection cam 636. The duplex unit 620 reverses the sheet and feeds it to the drum 514 again. The sheet which has entered the unit 20 is stacked on an intermediate tray 502 by convey rollers 501. When a designated number of sheets each having an image printed on its first side are stacked on the intermediate tray 502, a convey roller 503 feeds the sheets one by one from the intermediate tray 502 in response to a second side copy start command from the reader 5. The sheet fed from the intermediate tray 502 is fed to the registration rollers 633 by convey rollers 504. The image on the drum 514 is then transferred onto the second side of the sheet as in the case of the first side. The sheet is exhausted to the sorter 13 through the fixing unit 635, the deflection cam 636 and convey rollers 637 and 661. In this manner, two-sided copying is performed.

When the copy operation is started, by means of communication, the operation mode (one of the sort, group, and non-sort modes) is signalled to the sorter 13. When a sensor (not shown) mounted on the convey roller 661 detects a sheet, the sorter 13 begins to operate in the designated mode. For example, if the sort mode is selected, when one sheet is exhausted into a given bin, the bins are shifted uoward by one bin each, and the next sheet is supplied to the next bin. (In this sorter, bins are shifted upward to perform sorting. If the group mode is selected, the bins are shifted upward when the original is changed. If the non-sortmmode is selected, bin shifting is not performed and the all sheets are exhausted to the uppermost bin.

Two-sided copying is performed in the manner described above. In single-sided copying, the reverse operations in the RF 2 and the duplex unit 20 can be omitted, and the remaining details are the same. When a convey path is provided to feed sheets each having an image on one side to the duplex unit without reversing the sheets, a plurality of images can be superposed on the same side of the sheet.

The MCU will be described with reference to FIGS. 4(A) and 4(B).

FIG. 4(A) shows the internal configuration of the MCU 23. Four readers 101 to 104 and four printers 111 to 114 are connected to the MCU 23. The MCU 23 consists of a multi-input/multi-output controller (to be referred to as an MIMOC hereinafter) 120, and synchronous memory boards (to be referred to as SBDs hereinafter) 121 to 124 which have one-to-one correspondence with the printers 111 to 114.

The MIMOC 120 is connected to the readers 101 to 104, and has serial circuits 131 to 134 connected to the respective readers and a serial circuit 135 connected to the printers 111 to 114. These circuits are controlled by a CPU 140. The CPU 140 is operated by a control program written in a ROM 141, and controls the overall MCU 23 using a RAM 142 connected to the CPU bus, an I/0 port 143, an interruption controller 144, and a timer circuit 145.

A control bus CB and an image bin IB connect the MIMOC 120 to the SBDs 121 to 124.

The image bus IB returns both image signals and the control signals thereof supplied from the readers 101 to 104.

The control bus CB transfers a serial signal between the MCU 23 and the printers 111 to 114 (the printers 111 to 114 communicate with the MCU 23 by the serial signals produced by the serial circuit 135), and an SBD control signal from the I/O port 143.

In this embodiment, the copy start is commanded by the reader, and the MCU 23 is a slave with respect to the reader 5. For this reason, since the time when a serial signal may be received is not determined, one serial circuit in the MCU 23 is assigned to each reader so that a serial signal from any reader can be processed by the CPU 140. In relation to the printers, the MCU 23 is a master. Therefore, exchange of the serial signals with the printers can be performed serially. Therefore, only one serial circuit 135 is assigned to all the printers.

The SBDs 121 to 124 serve to synchronize the printer operations with outputting of the image signals from the reader. The SBDs will be described in more detail with reference to FIG. 4(B).

Figure 4B:
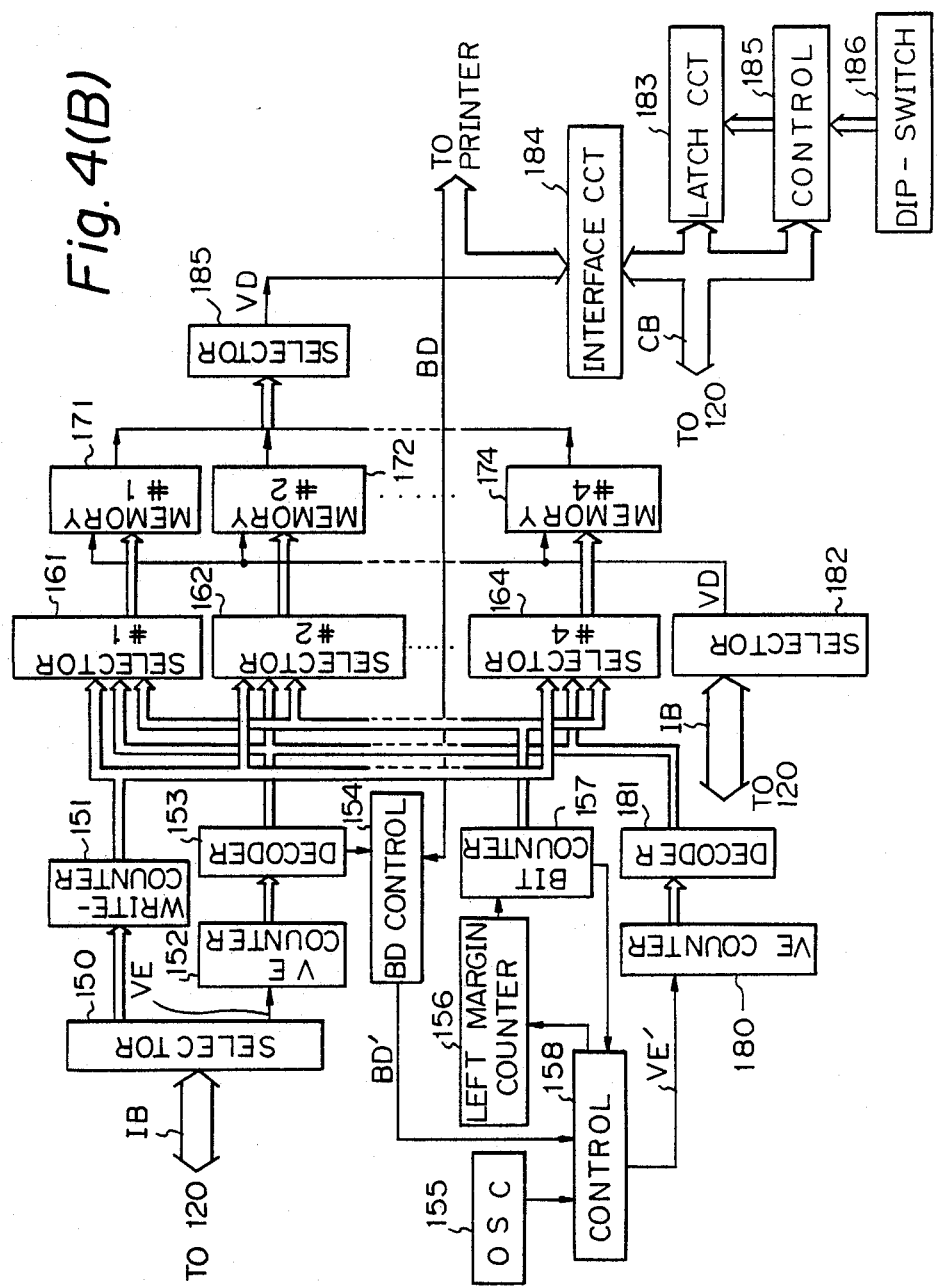
FIGS. 4() and 4(B) are block diagrams showing the internal configuration of an MCU.

FIG. 4(B) is a block diagram showing the configuration of the SBDs 121 to 124. Referring to FIG. 4(B), a selector 150 receives control signals in the image signals from the readers and selects a control signal of the reader assigned to the CPU 140. The control signal selected by the selector 150 is supplied to a write-counter 151 and a video enable (VE) counter 152 so as to generate write address signals or write select signals for writing image signals in memories 171 to 174.

A selector 182 selects an image signal of the selected reader. The image signal selected by the selector 182 is parallel-supplied to the memories 171 to 174 and stored in memories selected by selectors 161 to 164.

The write-counter 151 generates address signals for writing image signals in the memories 171 to 174.

The address signals are supplied to the selectors 161 to 164.

The VE counter 152 counts a control input line (VE signal) of one line of the image and the count of the counter 152 is supplied to a decoder 153. The decoder 153 generates a write select signal to designate which one of the memories 171 to 174 is to write the image signal. The write eelect signal is supplied to the selectors 161 to 164.

The above circuits are initialized by a control signal line (VSYNC signal) representing start of the image signal send to the reader connected thereto. Memory write is performed in the sequential order of memories 171, 172, 173, 174, 171 and so on.

Readout of the image signals from the memories 171 to 174 is started when image signals have been written in half of the memories, i.e., when the image signals are written in the memory 172 in this embodiment. The read start control signal is generated by the decoder 153 and is supplied to a beam detector (BD) control circuit 154.

After being initialized by the VSYNC signal, the BC control circuit 154 inhibits output of the BD signal (BD' signal) sent from the printer connected thereto until a read start signal is supplied from the decoder 153. When the read start control signal is received, output inhibition is released, and the BD's signal from the BD control circuit 154 drives a control circuit 158 so as to perform memory readout simultaneously with memory write in the order of memories 171, 172, 173, 174, 171, and so on.

An oscillator 155 generates an oscillation signal providing a reference timing for memory readout. The control circuit 158 performs memory readout control in response to the BD's signal, and controls operation of a left margin counter 156 and a bit counter 157 at a predetermined timing (to be described later).

The control signal 158 generates a signal VE' similar to the signal VE, and supplies it to a VE counter 180.

The VE counter 180 counts the VE' signals and its count is supplied to a decoder 181. The decoder 181 generates a read select signal representing from which memory the image signal is to be read out, and supplies the select signal to the selectors 161 to 164.

The selectors 161 to 164 control memory write/read operation with respect to the memories 171 to 174 using signals from the write-counter 151 and the decoder 153 or signals from the bit counter 157 and the decoder 181.

Image signals read out from the memories 171 to 174 are supplied to a selector 185 which selects the image signal of only the selected memory. The selected signal is supplied to the printer as a VD signal.

The control bus CB is connected to a latch circuit 183, an interface circuit 184 and a control circuit 185.

The latch circuit 183 latches the select control signal to be supplied to the selectors 150 and 182. The latch circuit 183 latches the select signal when the control circuit 185 monitors the control bus signal and detects that the preset value by a DIP-switch 186 coincides with the SBD number designated by the control bus CB. In this manner, the operation of the MIMOC 120 and the SBDs is matched in accordance with the preset value in the DIP-switch 186.

Figure 5:
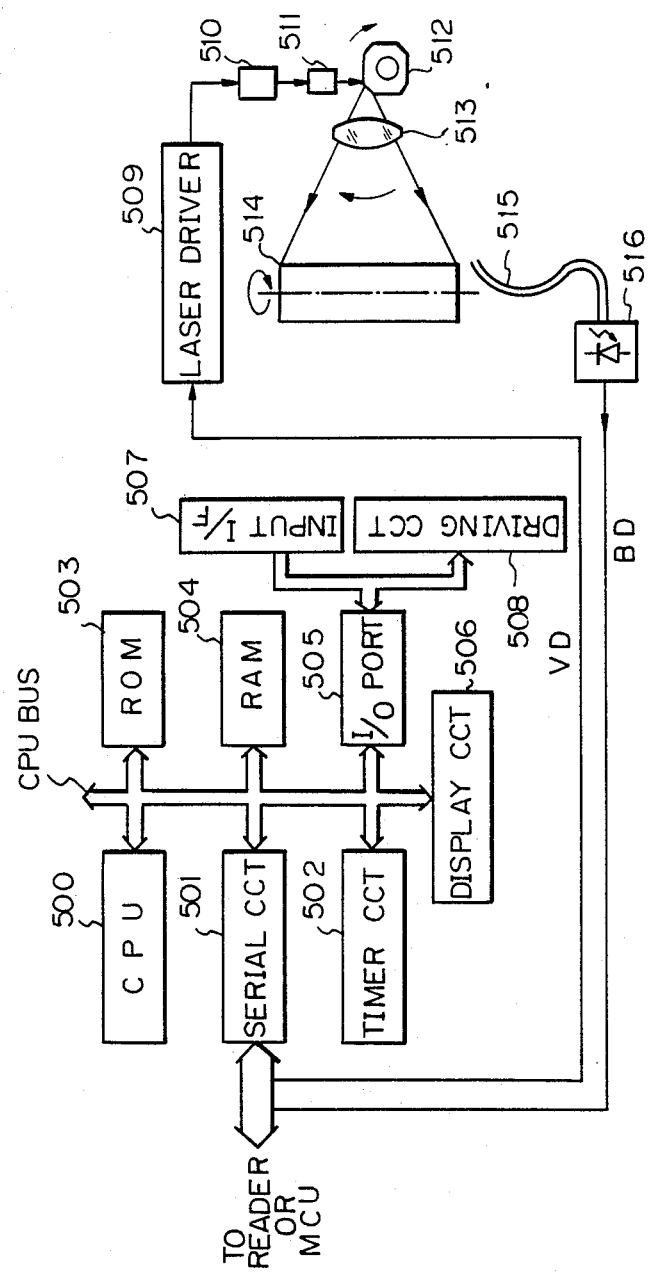
FIG. 5 is a block diagram showing the internal configuration of a printer.

FIG. 5 shows the internal configuration of a printer.

A serial signal from the MCU 23 or a reader is supplied to a serial circuit 501 and is processed by a CPU 500. The CPU 500 operates in accordance with a control program stored in a ROM 503, and controls the overall printer oeration by a RAM 504, a timer circuit 502, and an I/O port 505.

An input interface 507 performs input processing of the sensor signals from a paper sensor and the like in the printer. A drive circuit 508 is for driving a motor (not shown), a high-voltage transformer and the like. A display circuit 506 displays print conditions such as no paper or jam.

A VD signal (image signal) supplied from the MCU 23 or a reader is supplied to a laser driver 509 and is converted into a laser beam modulated by the VD signal by a semiconductor laser 510. The laser beam is focused by a collimator lens 511 and is scanned roughly parallel to the rotating axis of the drum 514 rotating in a predetermined direction by a polygonal mirror 512. The scanned laser beam is corrected in light amount by an f-θ lens 513 and irradiated onto the drum 514 to form an electrostatic latent image thereon.

The printer prints an image by the electrostatic recording scheme. Unneessary charges on the drum 514 are discharged by the laser beam. The remaining image is developed with a toner. The developed image is transferred to a sheet and fixed. Since the electrostatic recording scheme is known, a detailed description thereof is omitted.

The laser beam scanned by the polygonal mirror 512 becomes incident on an optical fiber 515 before irradiated onto the drum 514. When a photosensor 516 detects incidence of the light on the fiber 515, it produces an electrical signal (BD signal). As can be seen from FIG. 5, if a VD signal is produced after the BD signal is produced and the laser beam reaches the drum 514, the latent image can be formed at a proper position on the drum 514.

Figure 6:
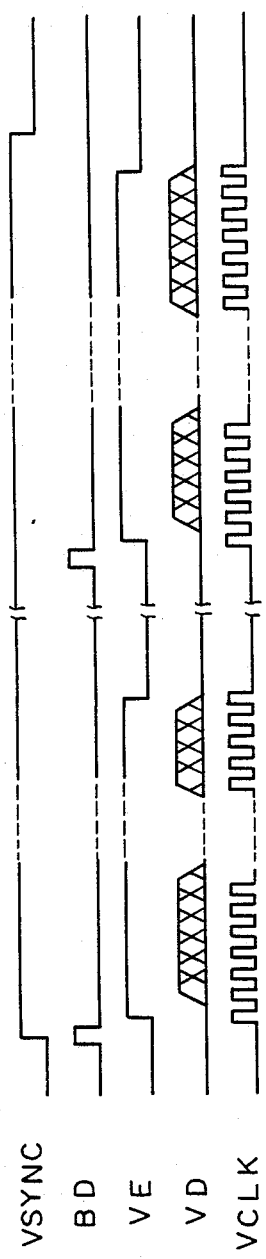
FIG. 6 is a timing chart showing image signals transferred between respective units.

FIG. 6 shows a timing chart of control signals for image signal output. Transfer of these control signals between the reader and the MCU and between the MCU and the printer is controlled at the same timing. The control signals are output based on the BD signal. However, since the BD signal is not transferred between the reader and the MCU, the reader has an oscillation circuit which can generate a pseudo-sync signal functionally the same as the BD signal. Control is performed based on this pseudo sync signal between the reader and MCU.

The VSYNC signal is a signal representing the image interval in the subscanning direction (paper feed direction). In response to the VSYNC signal, the printer rotates the registration rollers in synchronism with the transfer timing of the sheet. A signal VE represents the image signal interval in the main scanning direction and is output a predetermined left margin time after the BD signal. The image signal VD is output is synchronism with a video clock (VCLK) as a sync signal.

Figure 7:
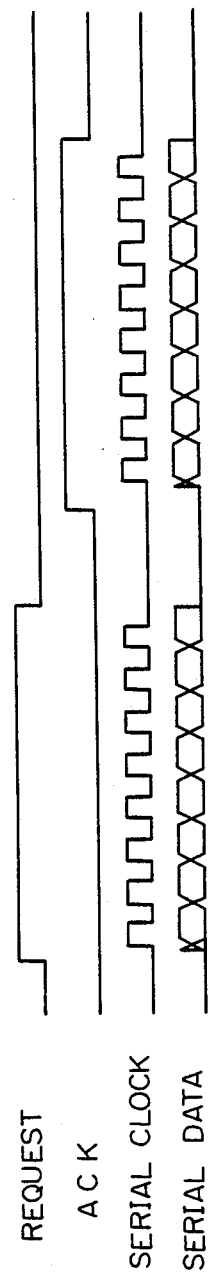
FIG. 7 is a timing chart of serial data transferred between the respective units.

FIG. 7 shows the timings of the signals between the respective units of the system. In this embodiment, respective control requests or information is communicated as 8-bit serial data. In each two units, a master is predetermined and always starts communication between the two units. For example, the reader is a master, as between the reader and the RF. The reader is a master between the reader and the MCU. The MCU is a master between the MCU and the printer. The printer is a master, as between the printer and sorter. More specifically, as between the reader and the MCU, the reader generates a request and transmits 8-bit serial data as codes of various information together with serial clocks as data sync signals. The group of data supplied from a master is called commands.

In response to a command from the reader, the MCU analyzes the command and supplies corresponding information through a signal line using serial clocks and data. When a communication enable signal is received, the MCU uses a signal ACK (acknowledgement). The group of data output in response to commands are called status. One communication cycle is completed when one status data is generated in response to one command. Therefore, when data has more than 8 bits, it is transmitted time serially.

Figure 8:
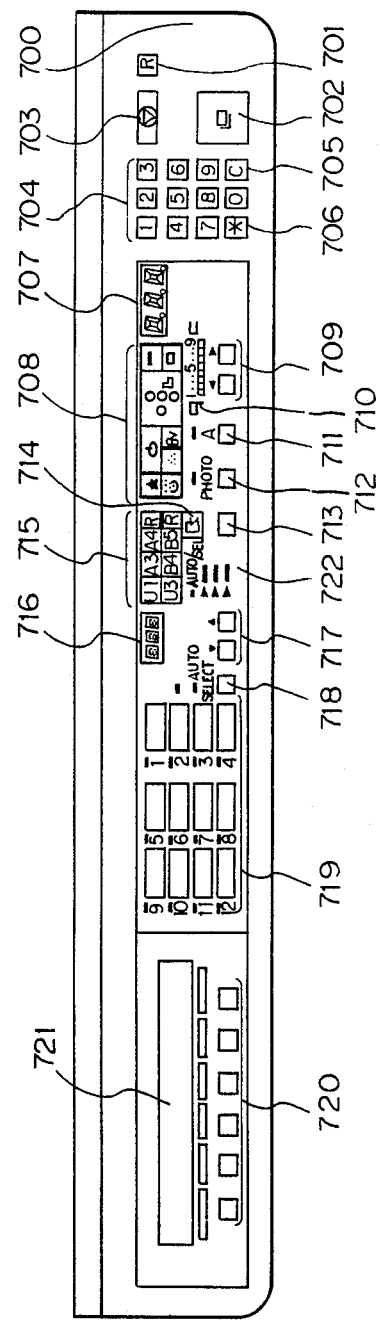
FIG. 8 is a view showing the outer appearance of a control section of a reader.

FIG. 8 shows the control section of the reader according to this embodiment. In this embodiment, the MCU and printer do not have control sections, and the reader controls the operation of the overall system. In addition, each reader can perform the same operation.

A copy mode reset key 701 is used to restore the standard wait mode from one of various modes. A copy start key 702 is used to start copy operation in a mode selected by a corresponding key. A stop key 703 is used to stop copy operation. Ten keys 704 are used to enter numerical data such as the number of sheets or the like. A clear key 705 is used to clear any input by the ten keys 704. An enter key 706 is used for inputting various information in a communication display to be described later. A sheet number display 703 has three digit positions. A printer error display 708 displays any abnormality in the printer. A key 709 is for manual copy density adjustment, a key 711 is for automatic copy density adjustment, and display 710 indicates the selected density. A key 712 is used to copy a photograph. A key 713 is used to select the paper size. Displays 714 and 715 display the paper sizes. A cassette/deck display 722 indicates the stored position of sheets of the selected size. Keys 717 and 718 are used to set a copy magnification. The selected magnification is indicated by a display 716. A preset key 719 is used to preset various modes and to waive need for resetting of the same modes. A key 720 is used to select a mode on a communication display 721.

Figure 2:
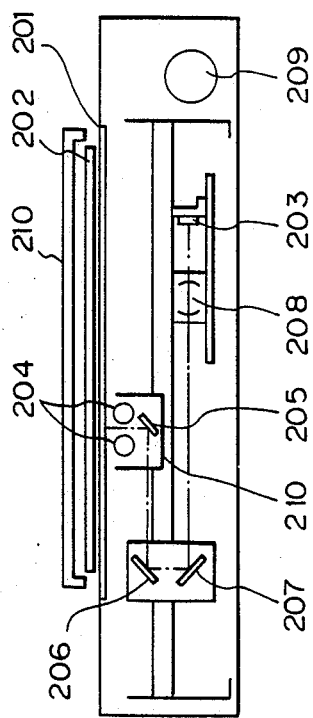
FIG. 2 shows the internal construction of a reader.
Figures 2, 12:
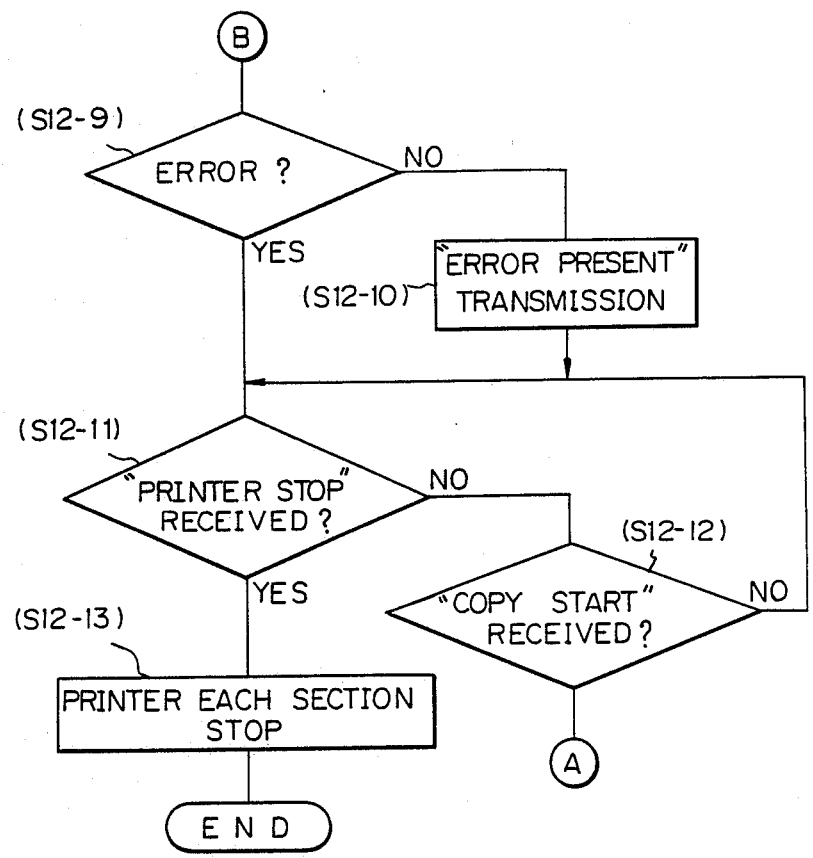

FIGS. 12-1 and 12-2 show the operation sequence of the microcomputer in the printer in image formation (printing). When a copy start command is eceived from the MCU 23 (S12-1), the printer starts operating the respective parts in accordance with a predetermined sequence (S12-20).

In this system, preprocessing such as charging of the drum must be performed since a printer of the electrostatic recording scheme using a photosensitive drum is used. After such preprocessing is completed, it is awaited until paper can be supplied. When paper can be supplied, a sheet of paper is fed from a cassette, a deck or the intermediate tray, which has been designated by the MCU 23 before copy start (S12-3, S12-4).

It is awaited until the supplied sheet reaches a position at which an image signal can be received (S12-5). When YES in step 12-5, a signal representing the image signal receivable state is supplied to the MCU 23 (S12-6).

When the image signal is received, a series of copy operations of developing, image transfer on the sheet, and exhaust of sheet outside of the printer are performed (S12-7, S12-8).

During this series of operations, it is checked if an error occurs and detection data is transmitted to the MCU 23 (S12-9, S12-10).

When a printer stop command is received thereafter, the printer is stopped and the series of copy operations are completed (S12-11, S12-13). When a copy start command is received, the next copy operation is started (S12-13).

Commands and status data transferred between the reader and MCU or between the MCU and the printer are shown in Tables 1 to 20 and will be described hereinafter.

Table 1 is a list of commands for requesting information of the printer and the MCU. Tables 2 to 10 show status data corresponding to the respective commands in Table 1.

Table 2 shows the overall status data which indicates the overall state of the printer in response to an overall status request command. An "in convey" bit is set at "1" when a sheet is being conveyed in the printer. A "printer fixing unit wait" bit is set at "1" when the fixing unit in the printer has not reached a predetermined temperature. An "error" bit indicates if an error has occurred in the printer.

Tables 3 and 4 show details of operator errors and service call errors in response to request commands therefor. Bits corresponding to the respective drive units and processing units are set when an error occurs at the corresponding units.

Table 5 shows the paper sizes set in the printer. A paper size is signalled in a code determined between the two given units in response to commands of size requests of the upper and lower cassettes and paper decks.

Table 6 shows an application request status for signalling what units are connected to the system in response to an application request command. Bits corresponding to respective units are set at "1" when they are connected to the system.

Table 7 shows a status representing a position in the printer at which an error has occurred. This status is generated in response to an error unit request command.

Table 8 shows data which is transferred between the reader and the MCU in response to a "number of sheets request command" and is used to signal the number of sheets supplied when one or more printers are used.

When a designated number of sheets are copied, the "final paper" bit is set at "1". When a jam occurs in any unit of the printer and a request is generated again, the "re-request" bit is set at "1".

Table 9 shows data presenting a printer number in response to an "error printer number request command" when a plurality of printers are used and an error occurs in one of them.

Table 10 shows status for signalling if sheets are set in each paper feed cassette or paper deck in response to a printer paper status presence/absence request command.

Table 11 shows commands output by the reader or MCU when an operation of the printer or MCU is requested. When a paper feed command designating a drum stop (copy operation stop) cassette or paper deck received and one of these commands is recieved by the printer or MCU, it transmits the overall status data (Table 2).

Tables 12 and so on show groups of commands and status data consisting of a plurality of bits. For example, Table 12 shows a paper size indication command EECO and is used between the reader and MCU. First, first byte command (80H) is sent from the reader, and the MCU then returns the overall status. The second byte (paper size) is sent to the MCU, and the MCU then returns the overall status. When the MCU receives the second byte, it performs processing corresponding to this command. In this manner, this command is sent by two communication operations. This also applied to commands shown in Tables 13 to 20.

Table 13 shows a printer number indication command EEC1 transferred between the reader and MCU. The command EEC1 is used when a plurality of printers are used or when a printer of a number different from that recognized by the MCU is used by the reader. The bit corresponding to the printer to be used is set at "1".

"Automatic printer selection" bit is set at "1" when a copy operation is started when at least one of designated printers is available. When the "automatic printer selection" bit is "0", if none of the designated printers is available (error has occurred or used by other readers) in the all printer mode, the MCU does not start copy operation.

Table 14 shows a command EEC2 for indicating the number of sheets or copies from the reader to the MCU or from the MCU to the printer. In a copy mode using a plurality of printers, the MCU assigns a number of sheets to each printer and signals the number to each printer.

Table 15 shows a drum start command EEC7 for requesting copy start. The "recovery mode" bit is set at "1" when copy operation is being performed in a recoverable mode after an error. Automatic paper selection indicates that a paper size indication is to be sent later. Drum start bits 0 to 2 respective indicate the first side, second side and both sides of a sheet by a 3-bit code. Sorter indication is also provided by a 3-bit code representing the sort, non-sort or group mode.

Table 16 shows a command status ECC0 for requesting printer information. A printer for which information is desired is indicated by the printer designation bit. When an "accessory request" bit is "1", the status request in Table 1 following it requests the status of the printer designated by this command. The printer information of this status is transferred as a code representing no printer, printer power off, an error, copy enable. When the printer is operating, the "in copy" is indicated. When it is "1", the "my printer" bit indicates that the information corresponding to the printer of the same number recognized by the MCU.

Table 17 is an exhaust unit status request EC6 and is used when the number of interconnected sorters or the number of bins of interconnected sorters must be determined.

Table 18 is a command ECC22 when a printer error must be signalled to the overall system when an error occurs in a printer when copy operation is started or when the copy operation is being performed.

The "status re-transmit request" bit of the first byte is set at "1" when an error such as a jam occurs in a printer after a series of copy operations and image information must be re-transmitted. The "start error" bit indicates that a printer is feeding paper during paper feed. The "start error" bit is a code representing (1) at least one printer among the printers designated in copy start operation (as in Table 19-2) is not available, (2) all the designated printers are not available, or (3) the designated number of sheets exceeds the capacity of the sorters or the both copy intermediate tray. Each printer error indicates details of an error occurred in a printer, and bits corresponding to errors indicated by "x"s in Table 18 are set at "1". Assignment of errors to code bits are shown in Table 19-1.

Table 20 shows a command status EEC 23 for transmitting the "number of re-feeding sheets" when a jam occurs in a printer and the MCU is used.

Figures 2, 13:
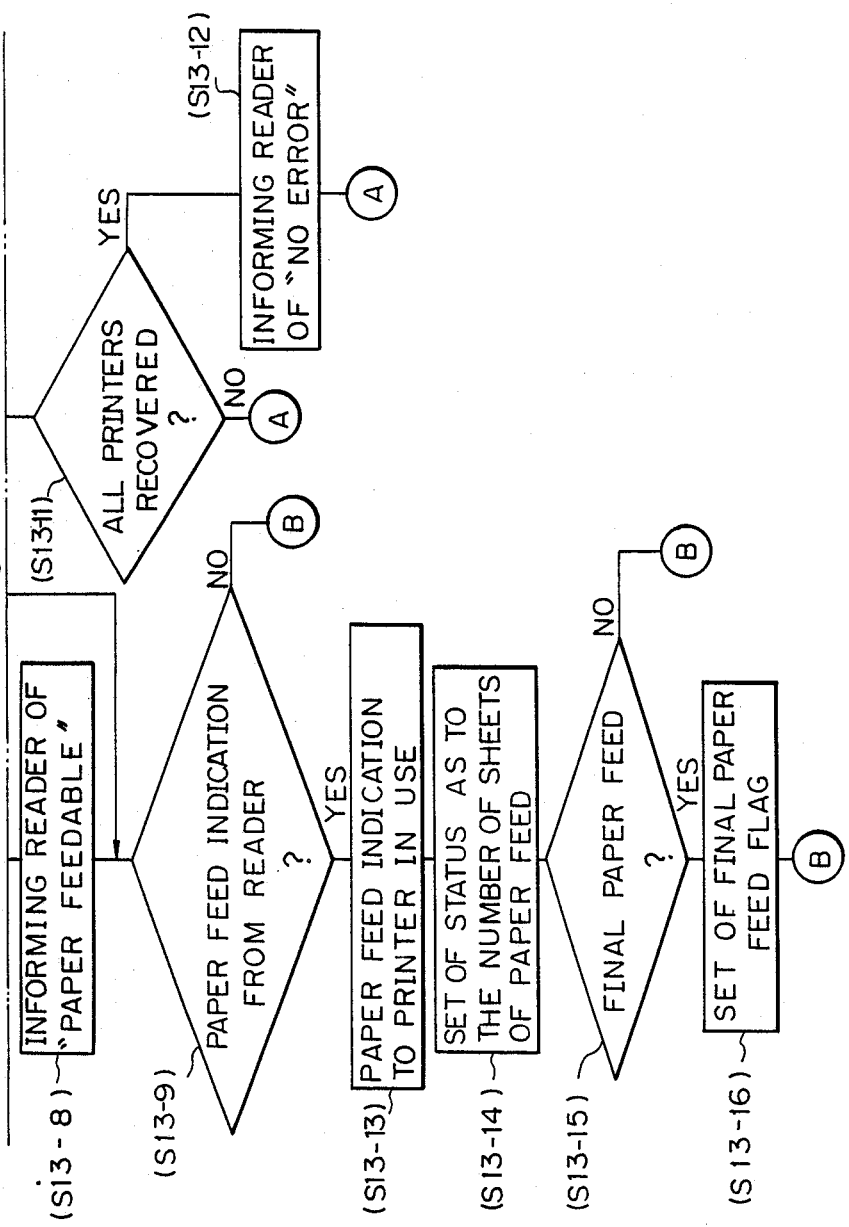
FIG. 13, consisting of FIGS. 13-1, 13-2, 13-3 and 13-4, FIG. 14, consisting of FIGS. 14-1, 14-2, 14-3 and 14-4, and FIG. 17, consisting of FIGS. 17-1, 17-2, 17-3 and 17-4, are flow charts of the microcomputer in the MCU.

FIG. 13 shows a flow chart of the operation of the MCU. The MCU performs the operation described below for each of the readers connected to the system.

It is first checked if a drum start indication is present (S13-1). Details of this checking operation will be described in detail with reference to FIG. 14. It is then checked if a drum stop indication is present (S13-2). If YES in step S13-2, the drum stop indication is supplied to the corresponding printer and stops its operation (S13-3). It is then checked if a single mode for performing image communication of a one-to-one correspondence between the reader and printer is selected. When it is determined that the single mode is selected, since control for assignment of the input image signals and the number of sheets is not necessary, the MCU directly supplies various signals to the reader and the printer (S13-4, S13-5). It is then checked if the printer is "in copying" (S13-6). If NO in step S13-6, it is checked if the recovery of a printer which has just caused an error is being awaited (S13-10). If YES in step S13-10, it is checked if all the printers used in the immediately preceding copy operation have been recovered and available (S13-11).

If YES in step S13-11, it is checked if all printers can feed paper (S13-7). If YES in step S13-7, a "paper feedable" state is communicated to the reader (S13-8).

When the "paper feedable" state is communicated from the reader (S13-9), a paper feed command is supplied to the available printer (S13-13). At this time, the "number of sheets" status is set by counting the number of printers which have produced the paper feed commands (S13-14). It is then checked if the paper is the final paper sheet to be fed. If so, the "final paper" flag is set (S13-15, S13-16).

In this embodiment, as described with reference to the circuit diagram of the MCU, the image signals and the like are automatically output through hardware including selectors and the like. Therefore, the microcomputer of the MCU is not directly associated with the image data.

The error check of the printer used is performed (S13-17) When a printer with an error is confirmed (S13-18), if it is after feeding the final paper sheet, the error is informed to the reader by the MCU data request status (S13-19, S13-20). However, if it is not after feeding the final paper sheet, it is then checked if the automatic recovery mode is selected (S13-21). If the automatic recovery mode is selected, the number of remaining sheets which has not been printed by the printer with the error and the number of re-feeding sheets are assigned to printers (S13-22). In this embodiment, if the non-sort mode or group mode is selected and the both copy mode is not selected, the number of remaining sheets which has not been printed by the printer with the error and the number of re-feeding sheets can be assigned to tther designated printers. This operation is called automatic recovery. If this automatic recovery is performed when the sort mode or two-sided copy mode is selected, a copy of sheets may be divided into a printer with an error and a printer which has recovered this error. Alternatively, even if the two-side copy is selected, only one side of sheets may be printed. In order to prevent these problems, in this embodiment, copy operation by automatic recovery is not performed when an error occurs during copy operation in the sort mode or the two-side copy.

When a re-feed request is sent upon occurrence of a jam, the "re-feed request" bit of the number of sheets status is set at "1" (S13-24). More specifically, when the copy operation is interrupted by a jam error, a sheet on which an image is not printed normally is present in the printer, and the operator must remove such a sheet. A copy count must corrected accordingly and the corresponding image signal must be re-supplied from the reader.

If the automatic recovery mode is not selected (i.e., in the sort mode or two-sided copy mode), it is awaited until all other designated printers complete copying of assigned number of sheets (S13-25). Thereafter, occurrence of the error is signalled by the MCU information request status (S13-16).

Figures 1, 14:
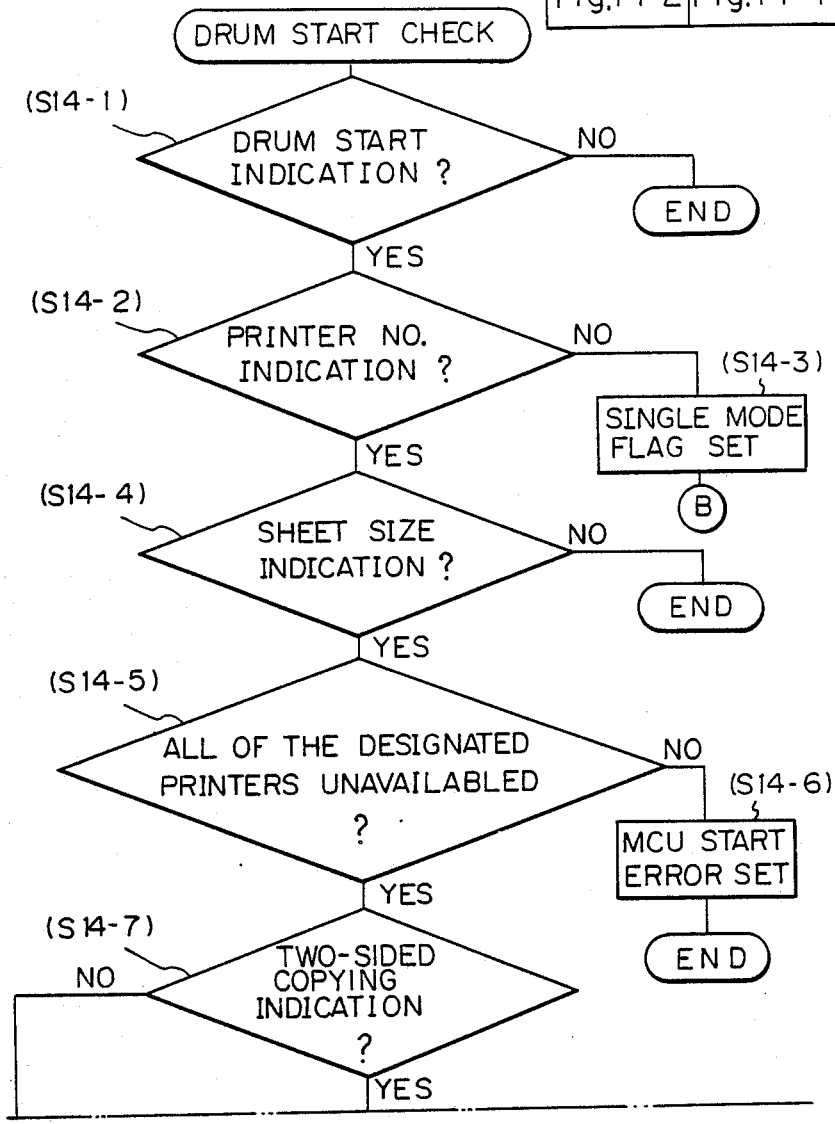
Figures 2, 14:
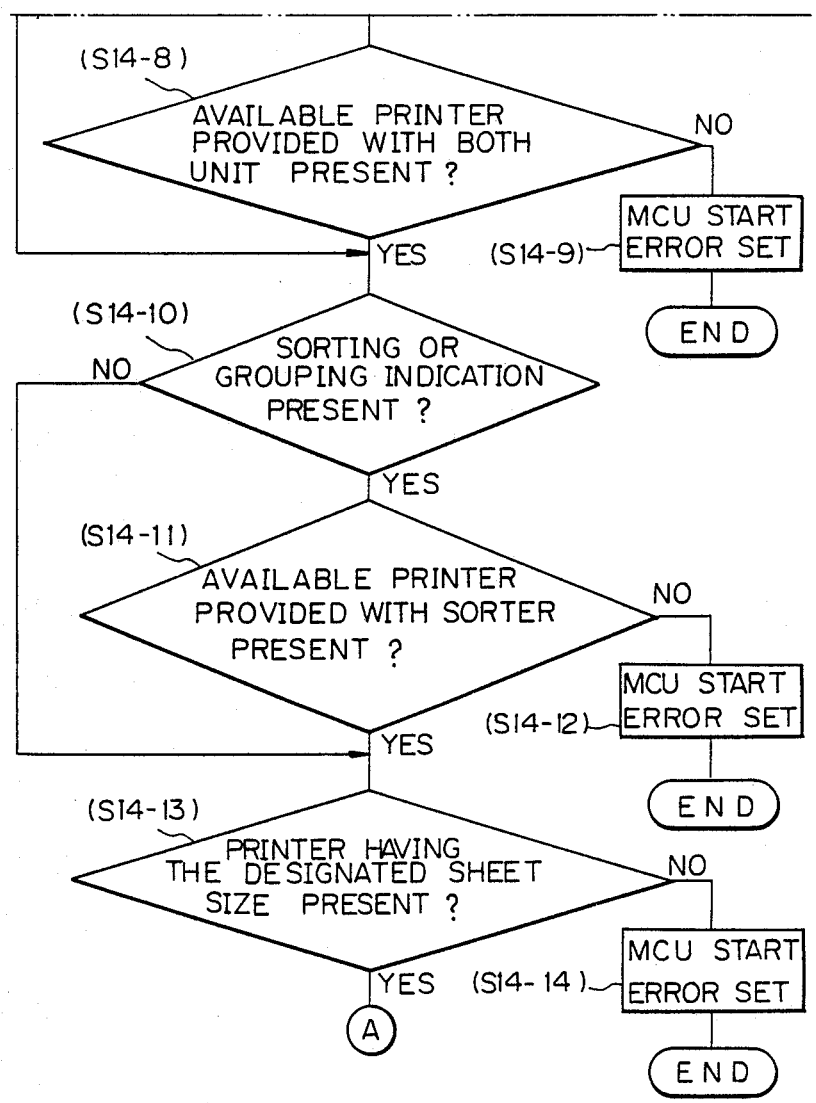
Figures 3, 14:
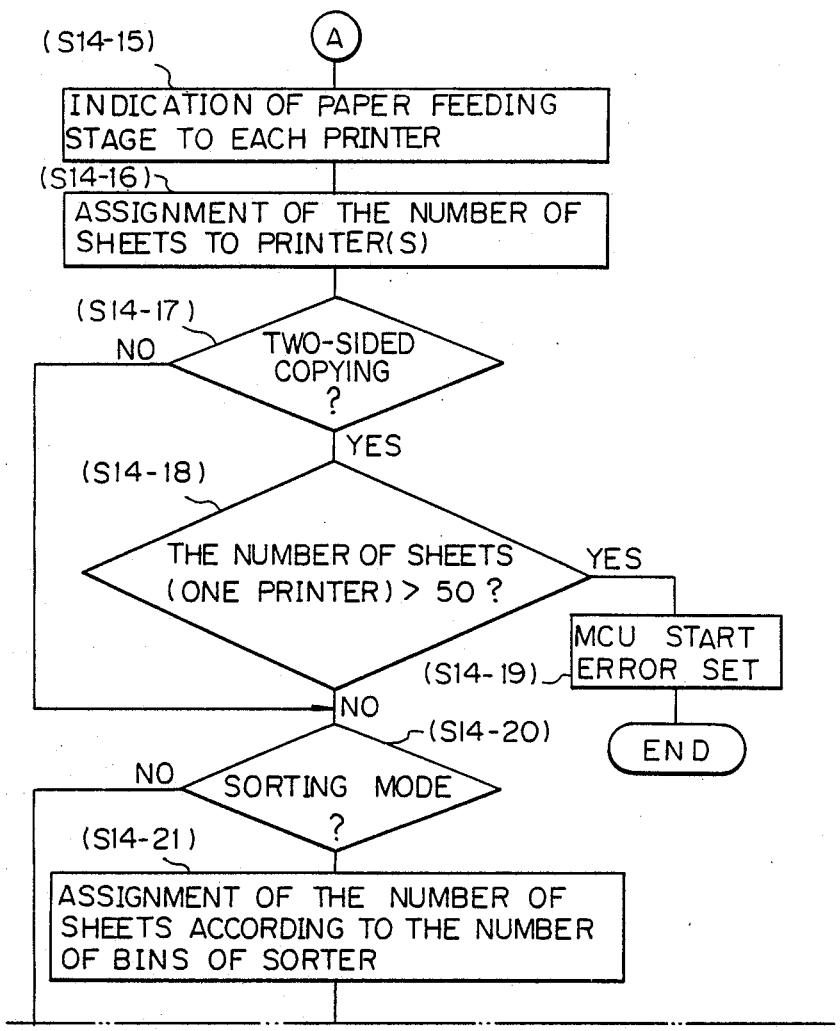
Figures 4, 14:
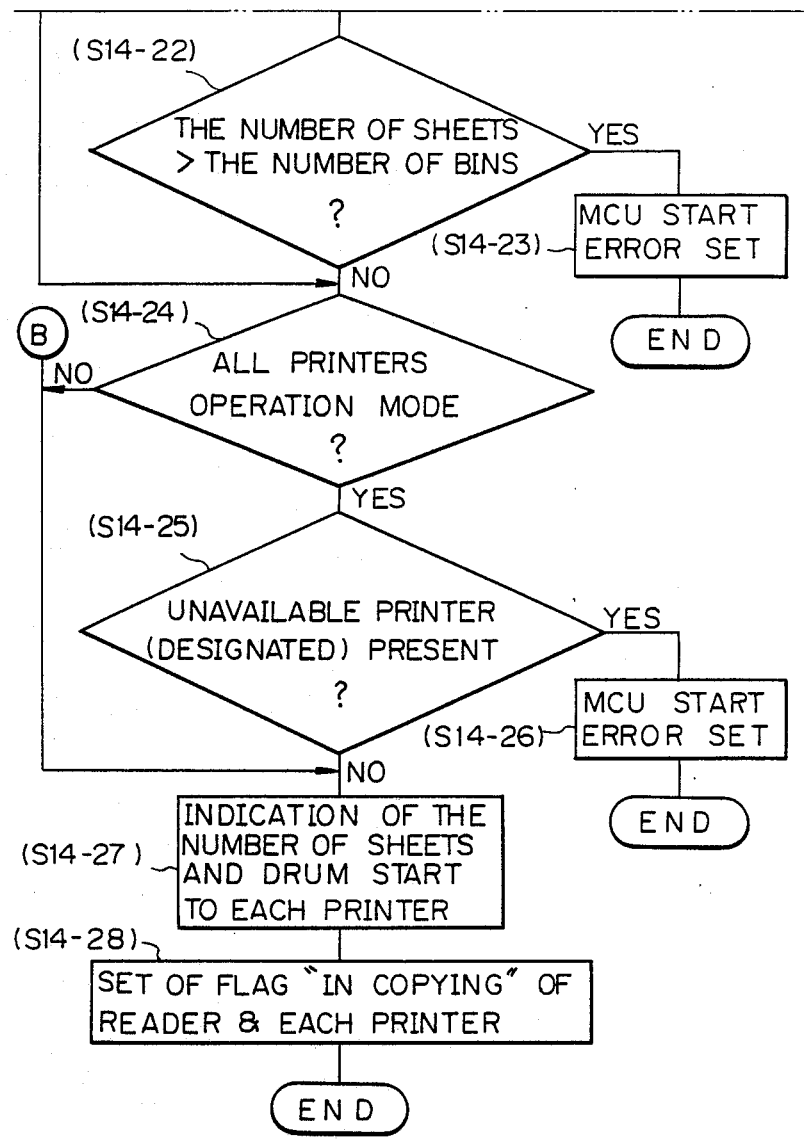

FIG. 14 shows a flow chart of drum start check in step S13-1 in FIG. 13. When copy operation using an MCU is performed, the "number of sheets", paper size and printer number indications are transferred before a drum start command is supplied. In this embodiment, this communication is always performed utilizing interruption processing at the timing described above. An indication from the reader is sent by setting a flag in a RAM upon reception of this indication, and the status is sent by fetching the status in the RAM in response to a request from the reader.

When a drum start indication is sent (S14-1), it is checked if a printer number indication is received. If NO, the single mode is determined and a drum start indication is supplied to a printer of the same number which has generated the drum start number (S14-2, S14-3, S14-27).

It is then checked if a paper size indication is sent (S14-4). When automatic paper size selection is performed, a paper size indication is sent after a drum start command. When a paper size indication is received, if any printer among the designated printers has an error or is unavailable due to use by other readers or the like, a status error code of the MCU information request status is set (A14-5, S14-6).

The state wherein one of the designated printers is not available since it is being used by another reader includes the following case. While a printer is in the process of image formation based on an image signal from a reader, even if it is not currently operating, it may be in an error recovery wait state after an error occurs before a designated number of copies are produced, or it may be in a re-start wait state after recovery of such an error. The latter state is necessary in order to allow correct sorting and two-sided copy when a sorter or a two-sided copy unit is used.

If any one of the designated printers is not available, it is checked if a both copy indication of a drum start command is present (S14-7). If a two-sided copy indication is present, it is checked if there is any available printer among designated printers, which has a duplex unit. If none of the available printers among the designated printers has a duplex unit (A14-8), a start error of the MCU information request status is set (S14-9). It is checked if there is a sort indication or group indication in the drum start command (S14-10). When there is a sort or group indication, it is checked if any of the available printers has a sorter. If none of the available printers has a sorter (S14-11), a start error of the MCU information request status ss is set (S14-12). In this embodiment, in the steps of checking respective conditions, only printers satisfying prescribed conditions are left. It is checked if there is a printer among the available printers, which stores paper of a designated size (S14-13). If there is no printer storing paper of a designated size, a start error of the MCU information request status is set (S14-14). The processing performed by the MCU or equivalents, regarding availability or suitability (e.g., presence of sorting) of the various printers, may be termed "discrimination" as to such availability or suitability.

After the above checking steps, when it is determined that there is at least one printer which is available, the paper feed cassette or paper deck is indicated to such a printer (S14-15).

In this embodiment, when an MCU is used, large-volume, high-speed copy is normally intended. Therefore, since paper decks, lower cassettes and upper cassettes can store more sheets in the order named, it is checked if paper sheets of a designated size are available from the paper decks. If a printer has a function of checking the number of remaining sheets by means of a sensor or the like and a function of informing the detection result of the sensor to the MCU, a cassette or paper deck having a larger number of remaining sheets is selected.

Steps S14-13, S14-14 and S14-15 will be described in more detail with reference to the flow chart shown in FIG. 17.

Figures 2, 17:
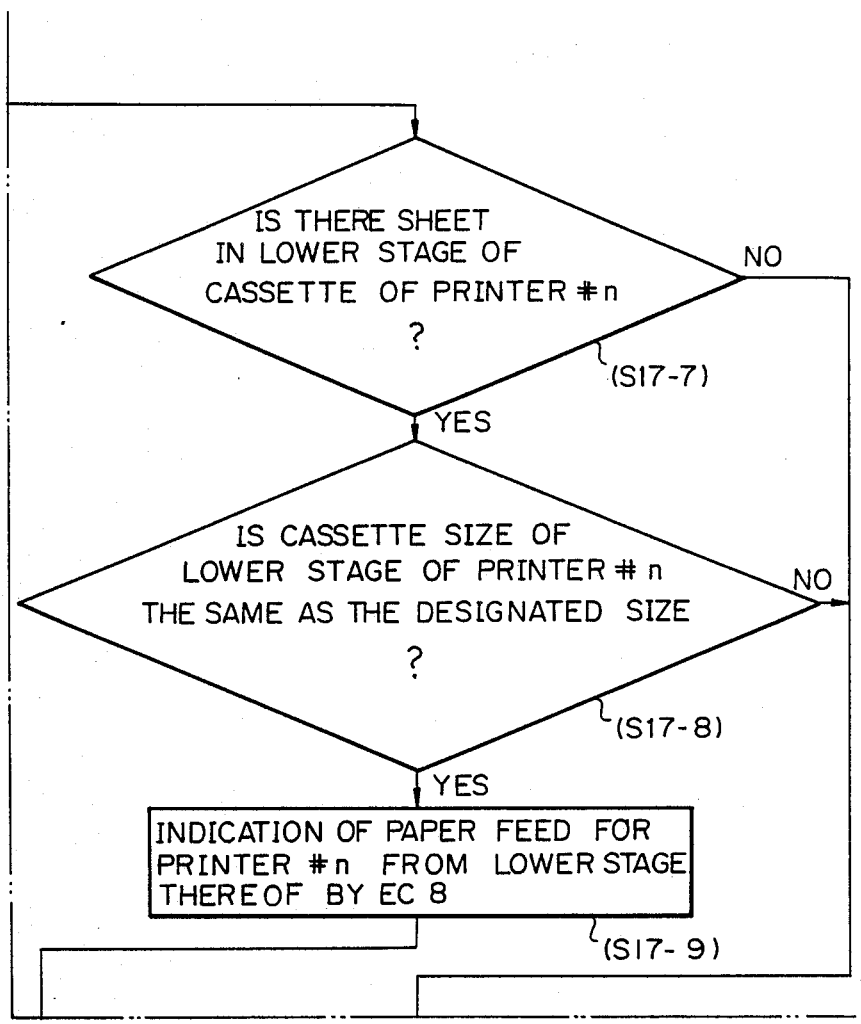
Figures 3, 17:
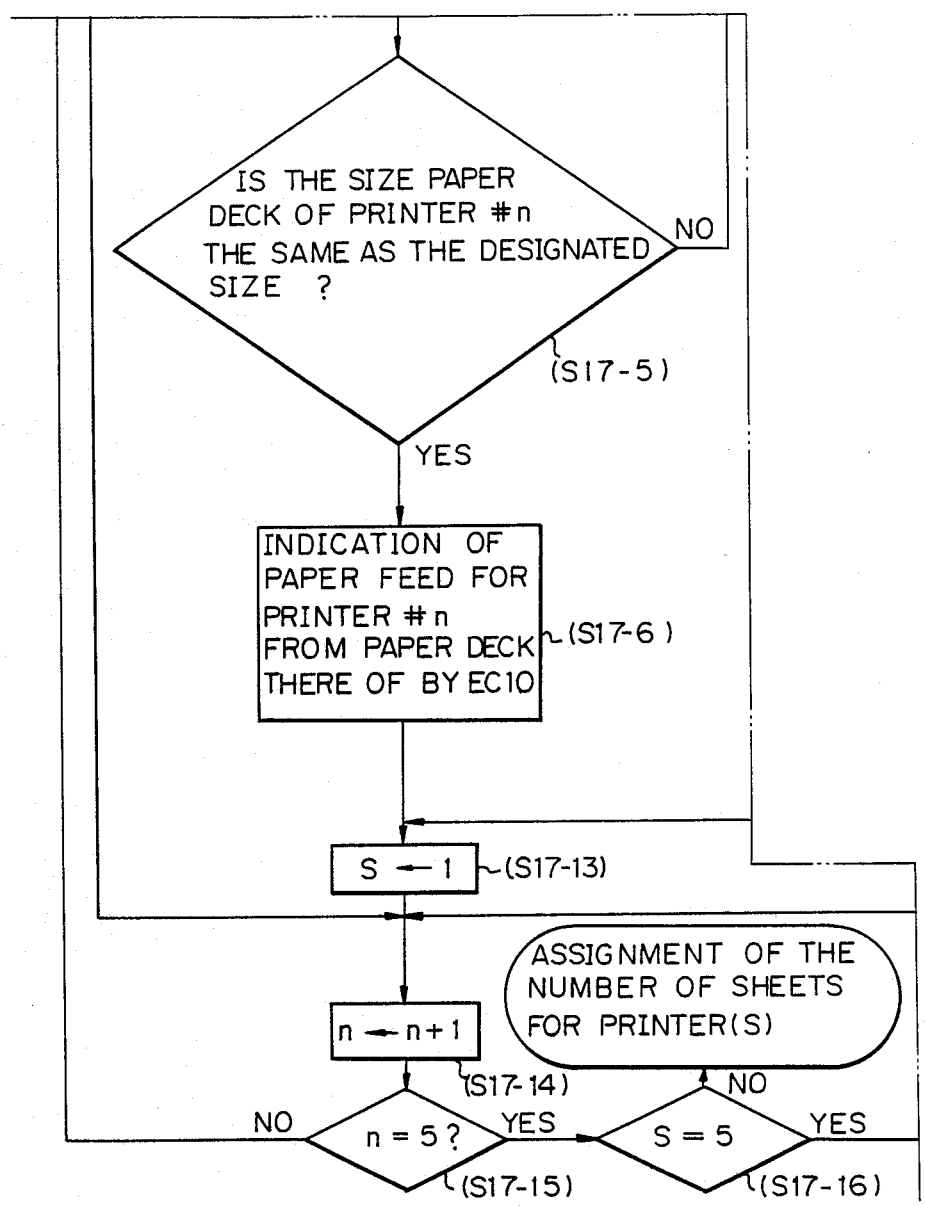
Figures 4, 17:
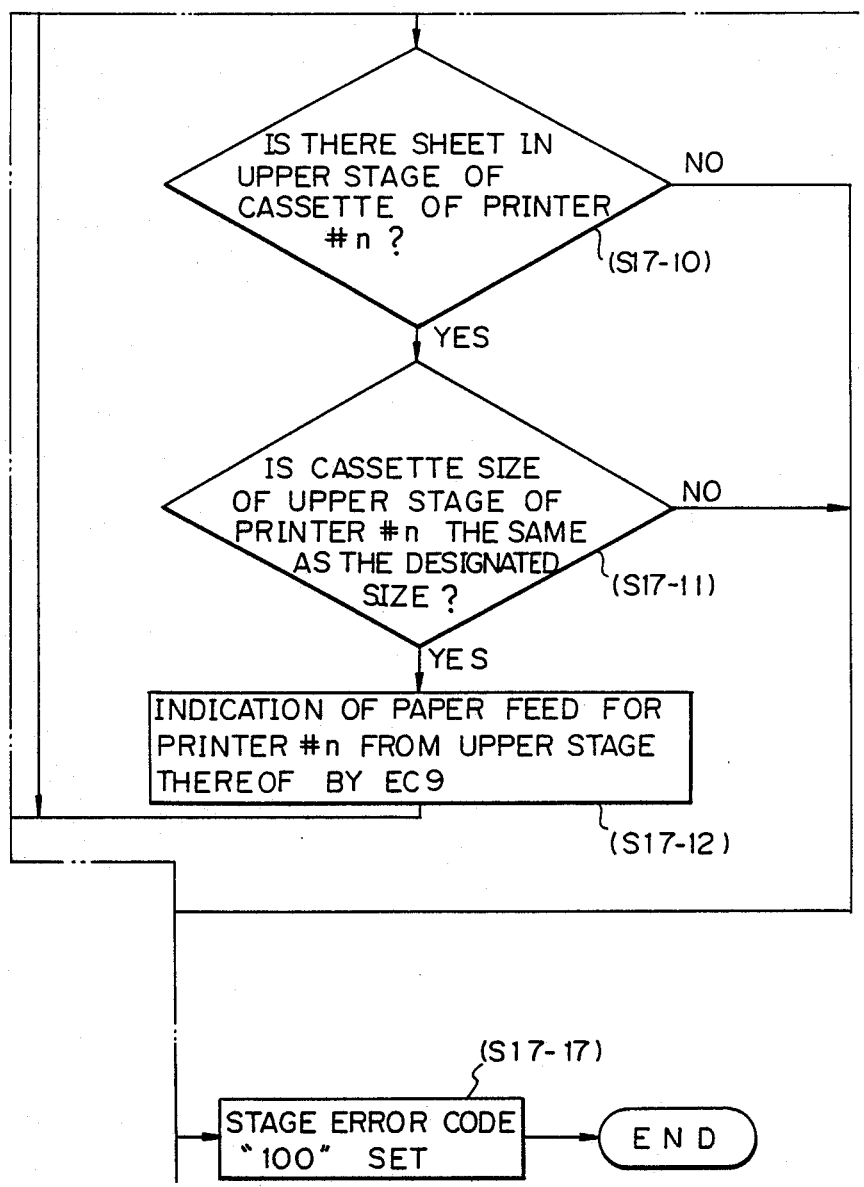

FIG. 17 shows a flow chart of the sequence of the MCU for paper size checking and paper feed cassette or paper deck indication for the designated and available printers. The sequence will be described below.

The flow chart shown in FIG. 17 corresponds to steps S14-13, S14-14 and S14-15 in FIG. 14.

First, a flag n is set at "1" and a flag S is set at "0" in the RAM 142 in FIG. 4(A). The flag n indicates the printer number to be checked. The flag S is set at "1" if at least one of the designated and available printers stores sheets of a designated size, and is set at "0" if there is no such printer. These flags are used to check if an MCU start error code "100" is set.

In accordance with the flag n, it is checked if the printer #1 is designated by the reader (S17-2). If YES in step S17-2, it is checked if the printer #1 is available (S17-3). If the printer #1 is not designated or unavailable, n←n+1 is performed (S17-14) and the same checking for the printer #2 is performed. However, if the printer #1 is designated and available, it is checked if a paper deck capable of storing a maximum of 2,000 sheets (largest capacity among the cassettes and deck) has sheets stored therein (S17-4). If YES in step S17-4, it is checked if the size of sheets stored in the paper deck coincides with the designated size (S17-5).

When the size of sheets stored in the paper deck coincides with the designated size, feeding of sheets from the paper deck is instructed by the command EC10 in Table 11. When it is determined in step S17-4 or S17-5 that there is no paper sheet in the paper deck or the size in the paper deck does not coincide with the designated size, it is then checked if the lower cassette capable of storing 500 sheets stores any sheets (S17-7). If YES in step 17-7, it is then checked if the sheets stored in the lower case have the designated size (S17-8). If YES in step S17-8, paper feed from the lower cassette is instructed to the printer #1 by the command EC8 (S17-7).

When it is determined that the lower cassette does not store sheets of the designated size, it is finally checked if the upper cassette having a minimum storage capacity (i.e., 250 sheets) stores sheets (S17-10). If YES in step 17-10, it is checked if the stored sheets have the designated size (S17-11). If the upper cassette stores sheets of the designated size, paper feed from the upper cassette is instructed to the printer #1 by the command EC9 (S17-12).

When paper feed from a cassette or paper deck is instructed to the printer #1 in step S17-6, S17-9 or S17-

12, the flag S in the RAM is set to indicate that sheets of the designated size have been available (S17-13).

After size checking and indication of the cassette or paper deck for the printer #1 has been performed in this manner, n is updated in the order of 2, 3, and 4 (S17-14) so as to perform processing of steps 17-2 to S17-13 for all the printers #2, #3 and #4. When this processing is completed for the four printers (S17-15), it is then checked if the flag S in the RAM is "0" or "1". If the flag S is "0", it is determined none of the cassettes and paper decks of all the designated printers had sheets of the designated size. Then, "100" is set in the MCU start error code and operation is not started (S17-17 or S14-14). If the flag S in the RAM is "1", the flow enters the printer sheet number assignment processing (S14-16).

The number of sheets is assigned to each available printer (the designated number of sheets is divided by the number of available printers) (S14-16). It is then checked, if, the two-sided copy indication is present (S14-17). If the two-sided copy indication is set, in this embodiment, since the intermediate tray of the two-sided copying unit has a capacity of 50 sheets, the two-sided copying can be consecutively performed for a maximum of 50 copies. Therefore, it is checked if the assigned number of sheets to each printer exceeds 50. If the assigned number exceeds 50, a start error of the MCU information request status is set (S14-18, S14-19).

It is then checked if the sort mode is selected. If the sort mode is selected (S14-20), the number of sheets assigned to each printer is reassigned in accordance with the number of bins of the sorter. More specifically, a maximum of 25 sheets are assigned to a printer having a sorter with 25 bins. A maximum of 50 sheets are assigned to a printer having a sorter with 50 bins (S14-21). It is then checked if the total number of sheets exceeds the total number of bins of the sorters to be used (S14-22). If YES in step S14-22, it is determined the copy operation in the sort mode cannot be performed and a start error code of the MCU information request status is set (S14-23).

When the all printer operation mode for performing simultaneous operation of all the printers designated by printer number indication is selected (S14-24), it is then checked if all the designated printers are available through various checking steps. If any one of the designated printers is unavailable (S14-25), a start error of the MCU information request status is set (S14-26). However, if all printer operation mode is not selected and at least one printer is available, a start error is not set.

When checking of the available printers is completed in this manner, the sheet number indication and the drum start indication are supplied to each printer (S14-27). The "in copying" flags of the reader and printers used are set in the RAM (S14-28).

FIG. 1 shows a system wherein four readers and four printers are connected by the MCU 23. However, a reader and a printer can be connected as a copying machine of the stand alone type.

In the system shown in FIG. 1, a mode wherein copying is performed with a pair of a reader and a printer of the same number is called the single mode. When the reader is powered, the single mode is set as the standard mode. Therefore, when the operator sets originals on the reader #1 and depresses the start key, the printer #1 starts producing copies.

The mode wherein a given reader supplies its output to a plurality of printers connected thereto through the MCU 23, or to a printer with a number different from that of the given reader is called the multi mode.

Figures 1, 11:
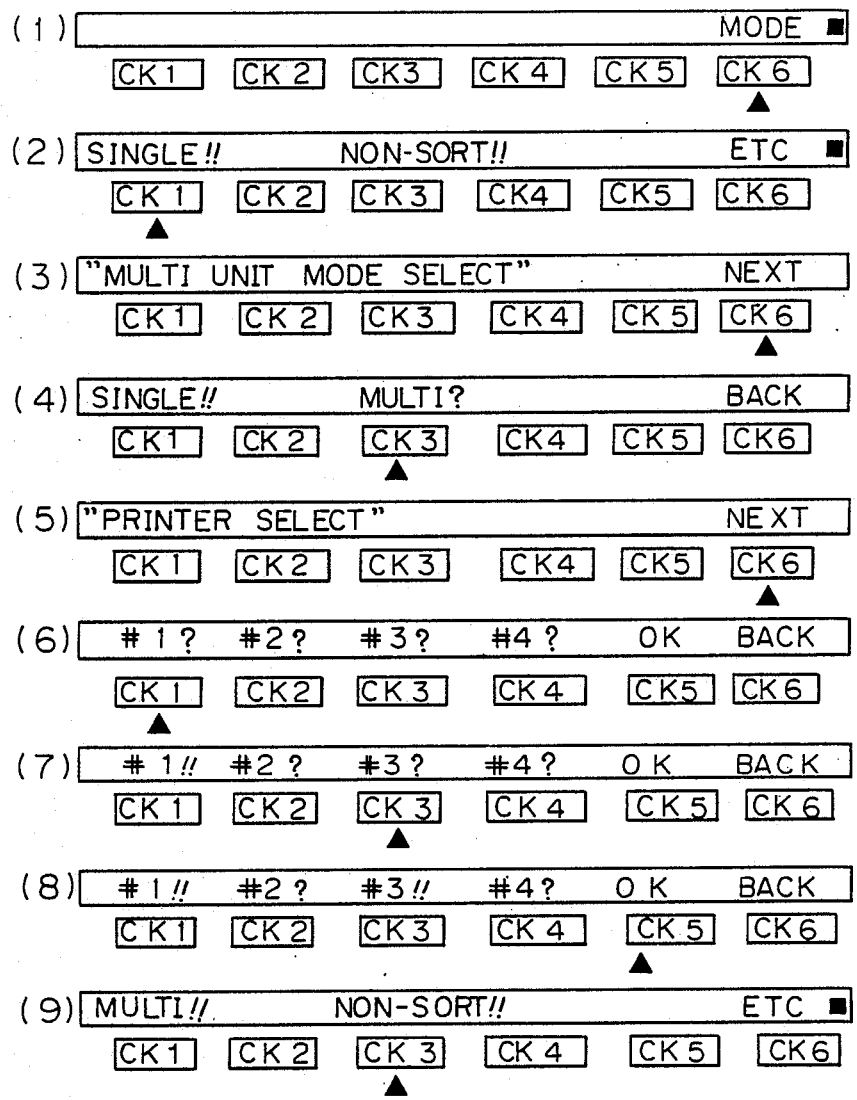
Figures 2, 11:
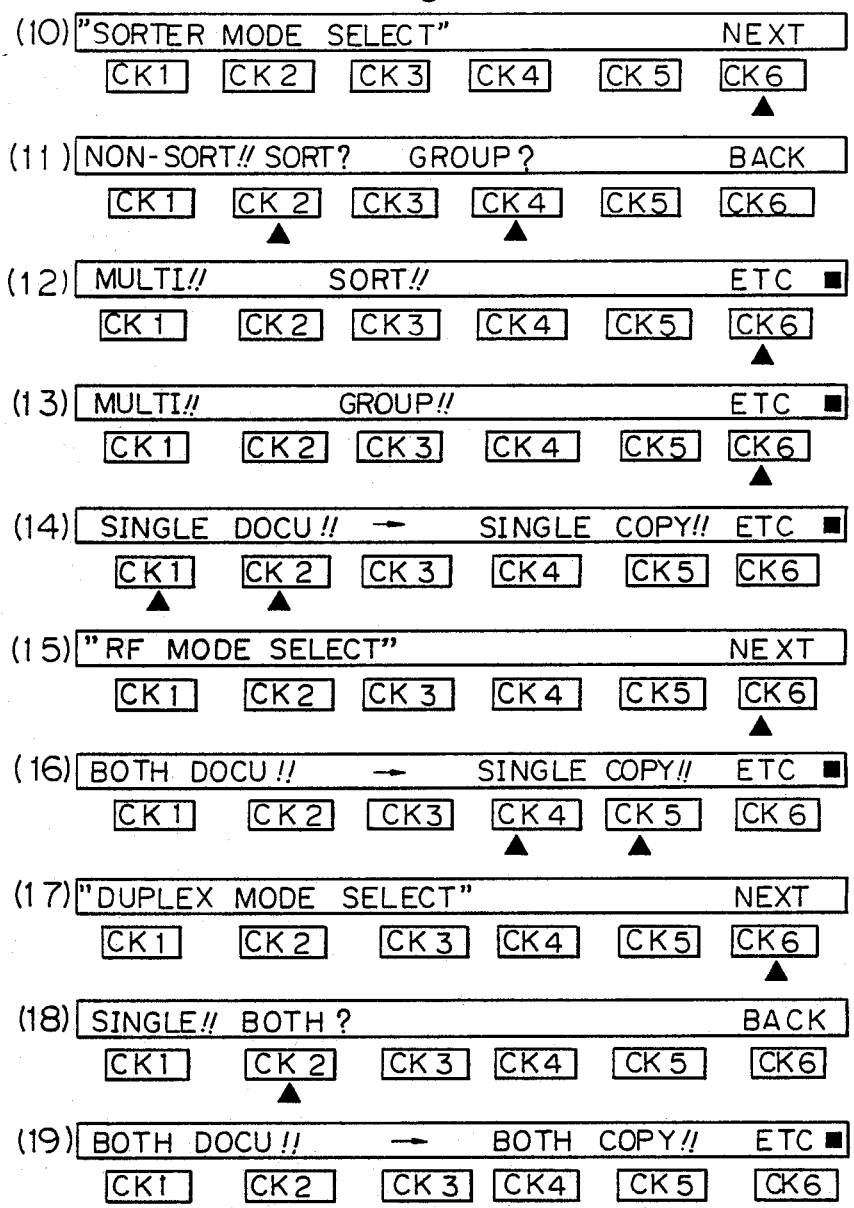

FIG. 11-1 shows the process of setting the multi mode in the communication control section (communication displays 721 and 720) of the reader.

When the reader is powered, the communication display (to be referred to as a CD hereinafter) 721 shown in FIG. 8 displays a state (FIG. 11-1 (1)) when the reset key is depressed. The communication display CD comprises a $5 \times 7$ matrix liquid crystal display having 32 digit positions. Six communication keys CK1 to CK6 are aligned below the display CD.

When a given copy mode is to be set and the key CK6 below the "MODE" display in the display in FIG. 11-1 (1) is depressed, the display is updated to that shown in FIG. 11-2 (2). "SINGLE!!" means that the single mode has been set. When the key CK1 corresponding to "SINGLE!!" is depressed, the multi mode is selected.

The "NON-SORT!!" indicates that a mode not using a sorter, i.e., the non-sort mode is selected. When the key CK3 corresponding to the "NON-SORT!!" is depressed, another sorter mode (group mode or sort mode) can be selected.

In this manner, the single mode +non-sort mode is set as the standard mode. Therefore, when the power is turned on or the reset key is depressed, when the key CK6 in the display in FIG. 11-1 (1) is depressed, the display is updated to that shown in FIG. 11-1 (2).

When the key CK6 corresponding to "ETC" in the display shown in FIG. 11-1 (2) is depressed, modes which are not displayed in the display in FIG. 11-1 (2), i.e., the RF mode and the duplex mode are displayed. The solid squares at the right ends of displays in FIGS. 11-1 (1) and 11-1 (2) indicate that a copy mode has been set. As can be seen from a comparison of displays in FIGS. 11-1 (3) to 11-1 (8), the solid square mark is not displayed during setting of the multi mode and is displayed again when the multi mode is set.

When the key CK1 is depressed in the display in FIG. 11-1 (2), the display is updated to that shown in FIG. 11-1 (3) and indicates that the multi mode is about to be set. As described above, the solid square mark is not displayed at the right end of the display. The display in FIG. 11-1 (3) is updated to that shown in FIG. 11-1 (4) after a predetermined period of time or when the key CK6 below "NEXT" is depressed. When the display in FIG. 11-1 (4) is provided, the operator is asked which one of the single and multi modes is selected. The fact that the single mode is selected and the multi mode is not selected is indicated by the mark "!!" after the "SINGLE" and "?" after the "MULTI".

When the multi mode is selected by depressing the key CK3, the display shown in FIG. 11-1 (5) is obtained.

When the key CK6 below "BACK" is depressed in display in FIG. 11-1 (4), the display returns to the standard display in FIG. 11-1 (2) and setting of the multi mode is interrupted.

In the display in FIG. 11-1 (5), the operator is prompted to designate a printer number. After a predetermined period of time or by operation of the key CK6, the display in FIG. 11-1 (6) is updated. In the display in FIG. 11-1 (6), the numbers of all the connected printers (#1 to #4 in this embodiment) are displayed. The fact that any printer is not designated is indicated by the mark "?" after the corresponding printer number.

It is assumed that the operator selects the printers #1 and #3. When the key CK1 is depressed in the state in FIG. 11-1 (6), the display is updated to that shown in FIG. 11-1 (7). The mark "!!" is attached after the "#1", indicating that the printer #1 is selected. When the key CK3 is depressed to select the printer #3 in the state shown in FIG. 11-1 (7), the display is updated to that shown in FIG. 11-1 (8). Since selection is thus completed, when the key CK5 below "OK" is depressed, the display is updated to that shown in FIG. 11-1 (9) and multi mode is selected.

When the key CK3 corresponding to "NON-SORT!!" is depressed in the display FIG. 11-1 (9), a mode other than the nonsort, i.e., the sort mode or group mode can be set following the process as indicated by the displays in FIGS. 11-2 (10) to FIGS. 11-2 (13).

When the key CK6 corresponding to "ETC" is depressed in the display in FIG. 11-1 (9), display in FIG. 11-2 (12) after the sort mode is selected or display in FIG. 11-2 (13) after the group mode is set, the display is updated to display in FIG. 11-2 (14) and the RF mode or the duplex unit mode can be set. The display "SINGLE DOCU!!" indicates that only a single side of an original set in the RF is copied. When the key CK1 or CK2 corresponding to the display is depressed, the display is updated to FIG. 11-2 (15) to indicate that the RF mode is about to be disignated. After a predetermined period of time or the key CK6 corresponding to "NEXT" is depressed, the display is updated to that shown in FIG. 11-2 (16).

In the RF mode, only the single or two-sided copy originals must be selected. Therefore, a display "BOTH DOCU!!BOTH DOCU?" is not provided. Instead, the display in FIG. 11-2 (15), is updated to that shown in FIG. 11-2 (16) and the two-sided copy mode is set. Extra load on the side of the operator is this omitted.

When the key CK4 or CK5 corresponding to "SINGLE COPY!!" in display in FIG. 11-2 (16) is depressed, the duplex unit mode can be set following the process using the displays in FIGS. 11-2 (17) to 11-2 (19). "BOTH COPY!!" is a duplex mode wherein images are formed on both sides of a sheet. Sheets on which images are formed on the first sides are temporarily stacked on the intermediate tray and re-fed therefrom to form images on their second sides.

In this manner, the operator can easily set a desired copy mode at the communication control section.

The process of setting a paper size in the multi mode in FIGS. 15-1 and 15-2 will be described below.

Assume that in the printer #1, sheets of A4 size are set in the paper deck, sheets of A3 size are set in the lower cassette, and sheets of A4 size are stored in the upper cassette. In the printer #3, sheets of A4 size are set in the paper deck, sheets of B4 size are set in the lower cassette, and sheets of A4R size are set in the upper cassette. The A4R size sheets are sheets having an A4 size but are fed in a direction 90° shifted from normal A4 size sheets. The A4R size sheets are used for copying at a magnification.

Figures 1, 15:
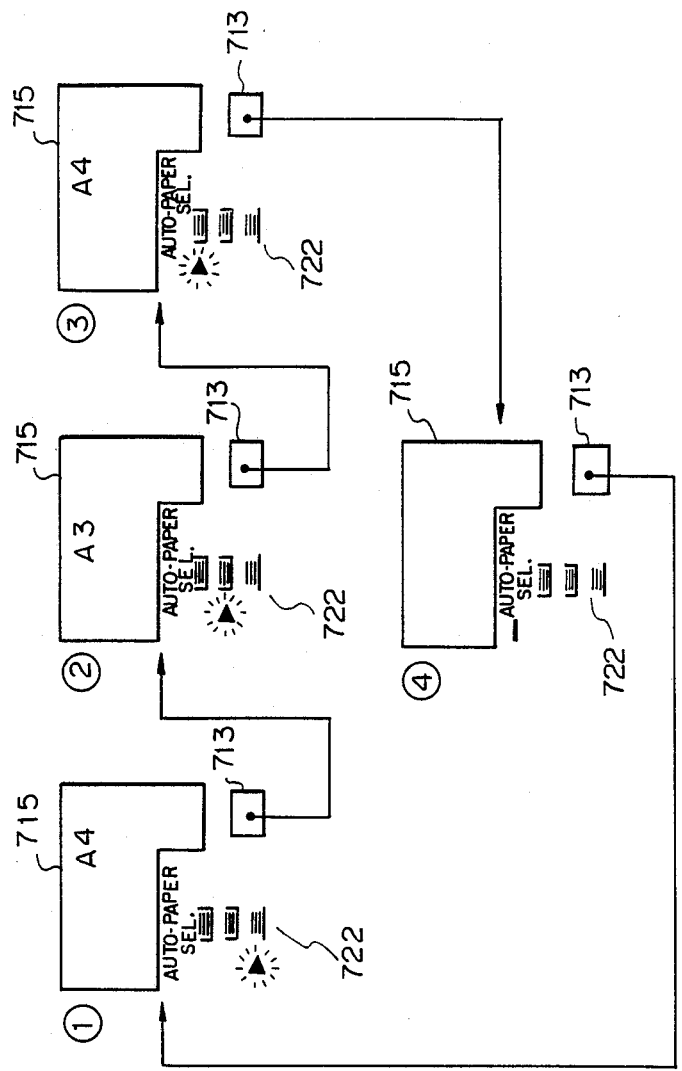
Figures 2, 15:
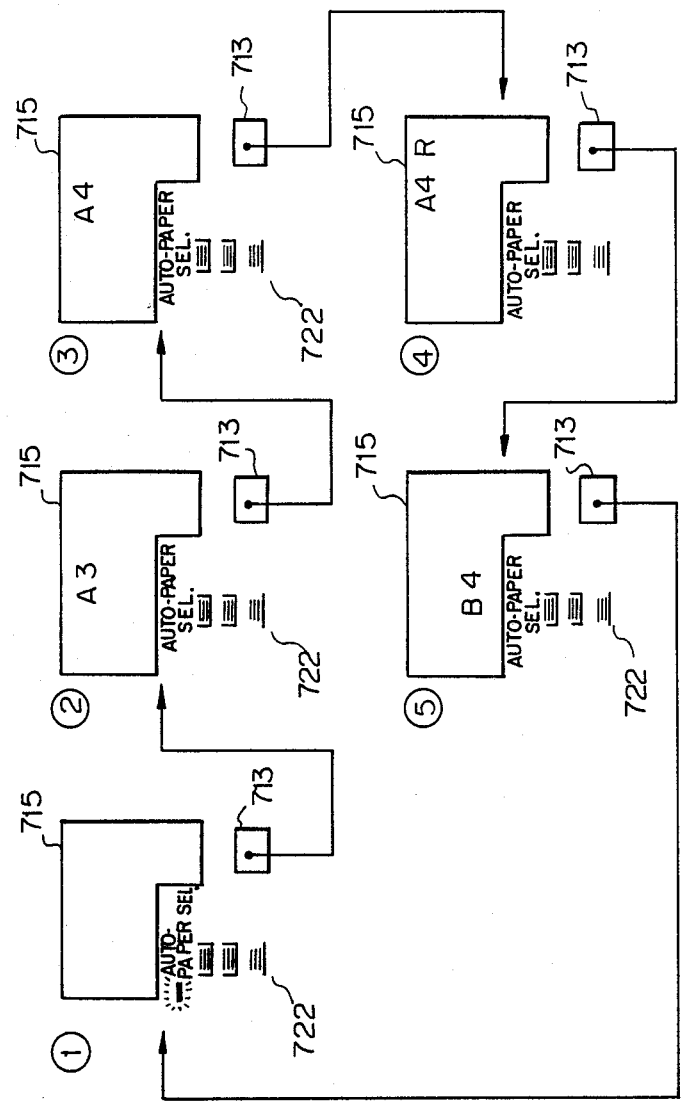

FIGS. 15-1 and 15-2 show diagrams of a cassette/deck display 722, a cassette size display 715 and a selector 713 in the reader #1. When the single mode is selected in the reader #1, every time a cassette/deck selection key 713 is depressed, as shown in FIG. 15-1, the sizes of sheets and storing positions in the printer #1 are repeatedly displayed in the order of 1 deck: A4, 2 lower cassette A3, 3 upper cassette: A4, 4 automatic paper size selection, and 1 deck: A4.

When the printers #1 and #3 are selected and the multi mode is set in the reader #1 in accordance with the procedures in FIG. 11-1, even if the cassette size display is in one of the states 1 to 4 in FIG. 15-1, it is updated to the state 1 in FIG. 15-2. That is, the automatic paper size selection mode is selected, and this is signalled to the cassette/deck display 722. Thereafter, selection of the paper size in the multi mode is performed by operating the cassette/deck selection key 713 using a copying machine of the stand alone type or a cassette size display selector as in the single mode, as shown in FIG. 15-2. Thus, paper size selection can be performed easily.

In the multi mode, the size of sheets set in the printer of the designated number is repeatedly displayed at the cassette size display 715 irrespective of the printer or paper feed unit (upper cassette, lower cassette, or paper deck) in the order of A3, A4, A4R, B4, B5, B5R, U1 and U3. Paper sizes not set in any of the designated printers are skipped and not displayed.

The display order described above is only an example and the sizes can be displayed in any other suitable order in accordance with frequently used paper sizes. It is also to be noted that the display need not start with automatic paper size selection of FIG. 15-2.

Figures 4, 13:
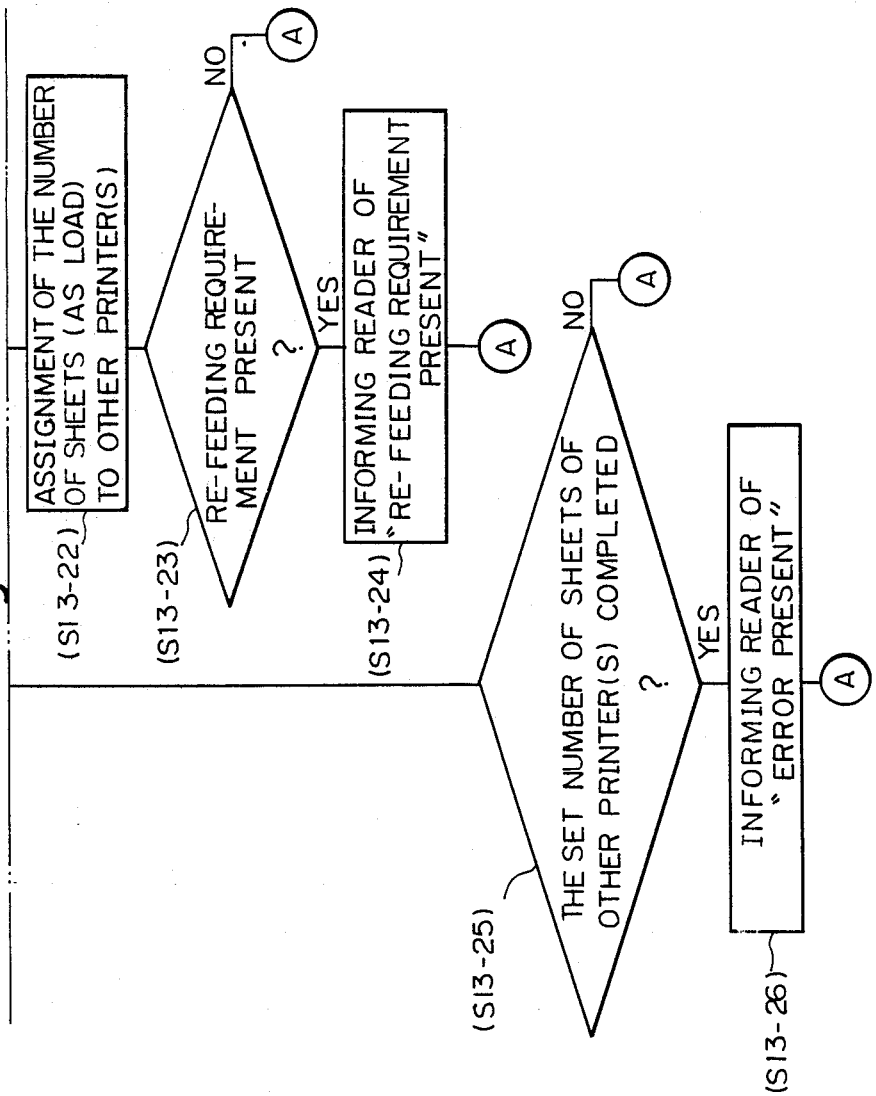

It is assumed that the multi mode using the printers #1 and #3 is selected. When the size selection key 713 is depressed in FIG. 15-2 1, since A3 sheets are set in the lower cassette of the printer #1, A3 is displayed as indicated in FIG. 15-2 2. When the key 713 is depressed in the state in FIG. 15-2 2, since A4 sheets are set in the deck in the printer #1 and the deck of the printer #3, A4 is displayed as in FIG. 15-2 3. When the key 713 is depressed in FIG. 15-2 3, since A4R sheets are set in the upper cassette in the printer #3, A4R is displayed as in FIG. 15-2 4. When the key 713 is depressed in FIG. 15-2 4, since B4 sheets are set in the lower cassette of the printer #3, B4 is displayed as in FIG. 15-2 5. When the key 713 is depressed in this state, since sheets of B5, B5R, U1 and U3 are not set in neither of the printers #1 and #3, the state returns to 1. This operation is repeated.

In this manner, in the multi mode, sheets of a designated size are selected from all the cassettes and decks of all the designated printers irrespective of the storage positions. Therefore, as can be seen from FIG. 15-2, the cassette/deck display 722 is turned off for all the upper cassette, lower cassette and deck.

In the multi mode, a plurality of printers are driven to perform high-speed copying. For this purpose, sizes of sheets stored in only designated printers are displayed and irrespective of cassettes or decks. Thus, efficient operation is performed.

Figures 1, 16:
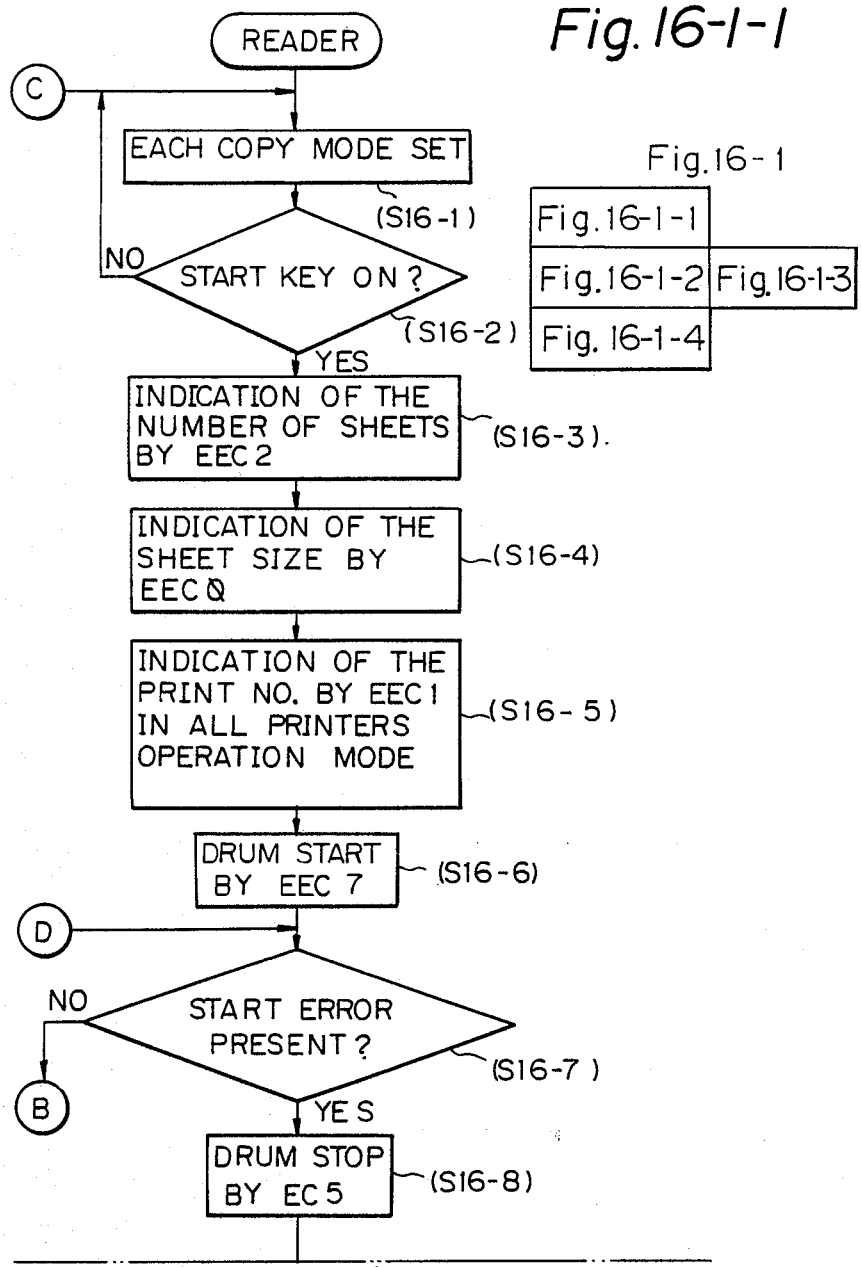
Figures 1, 2, 16:
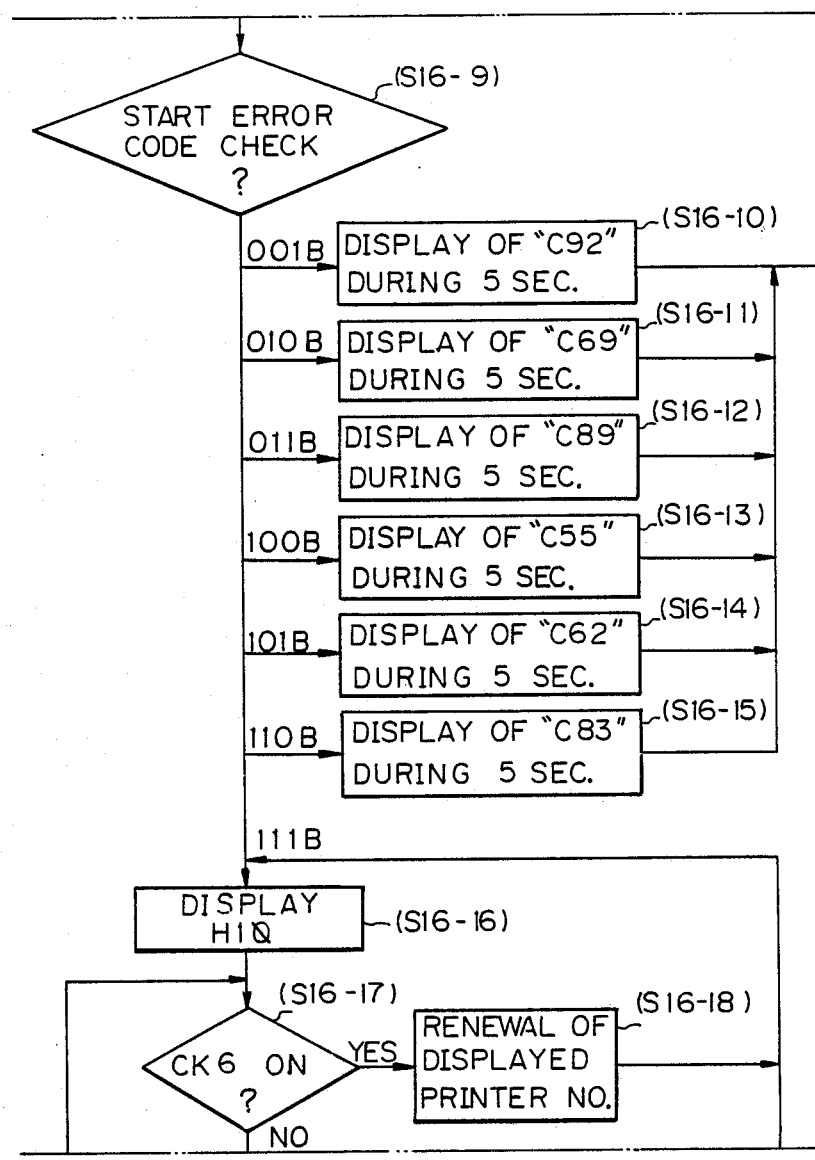
Figures 1, 3, 16:
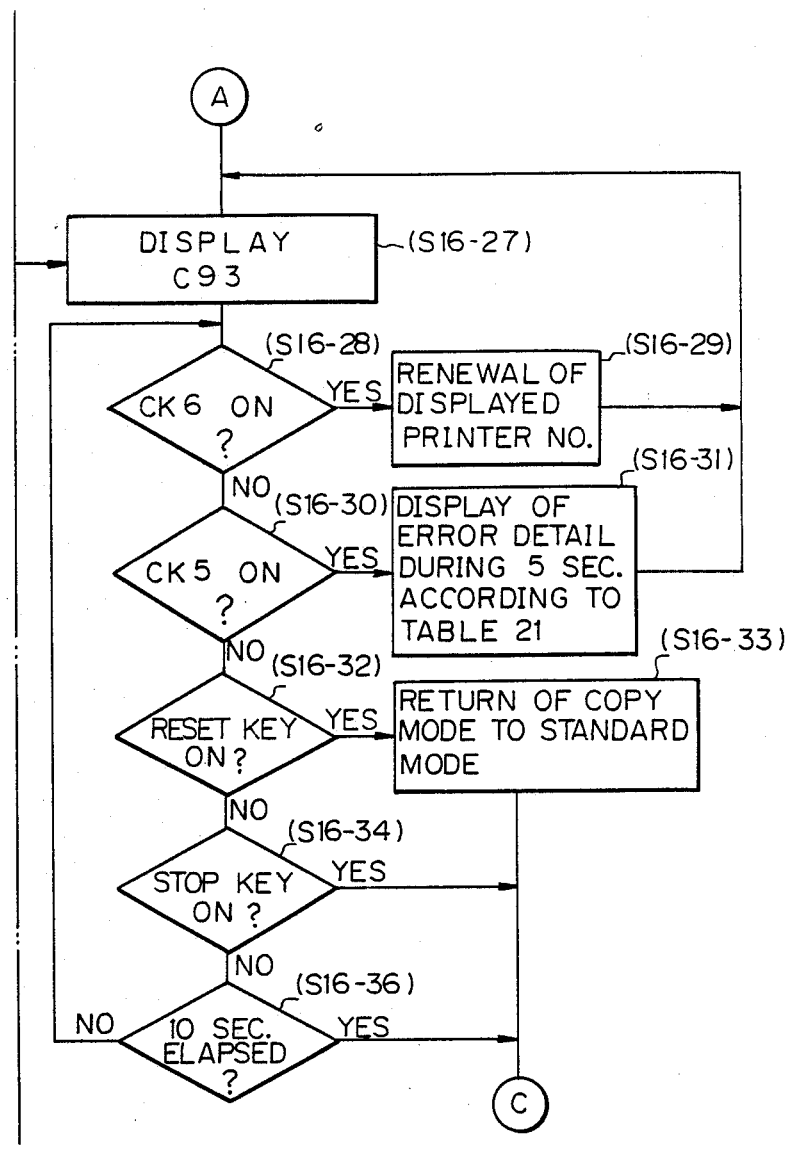
Figures 1, 4, 16:
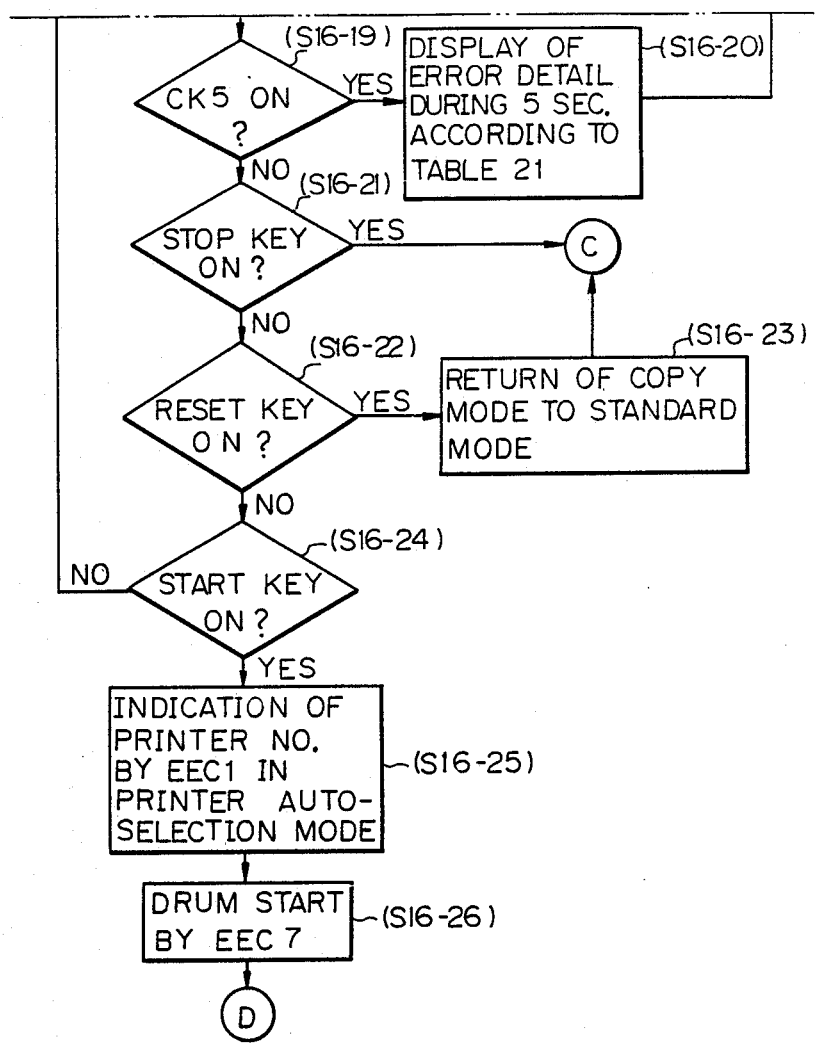
Figures 2, 16:
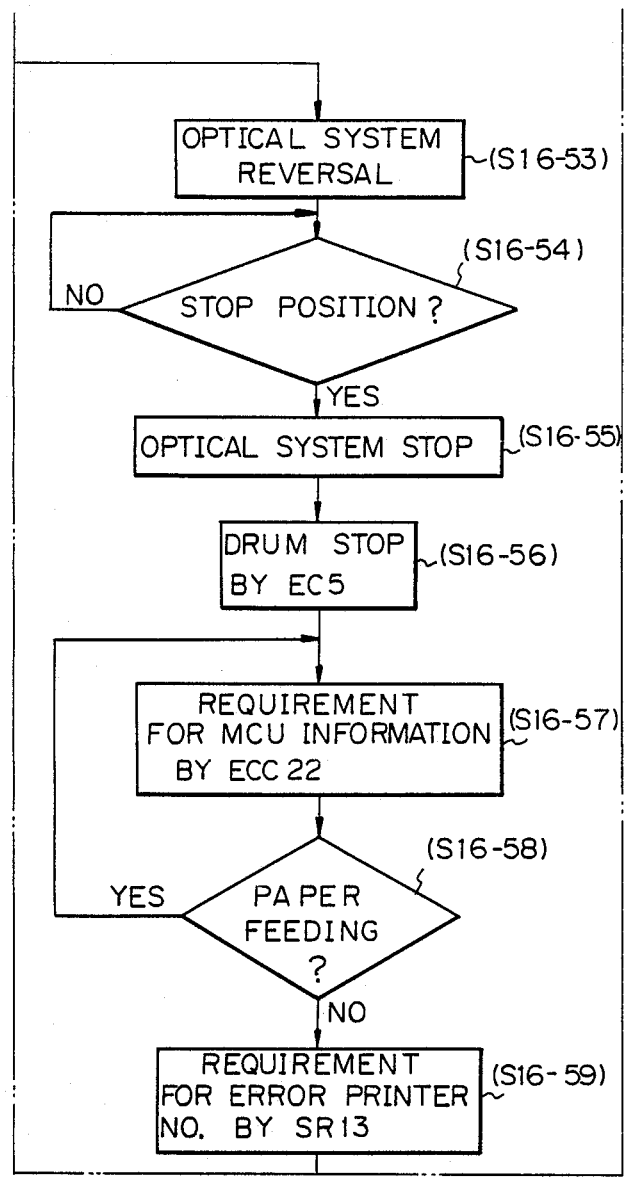
Figures 2, 3, 16:
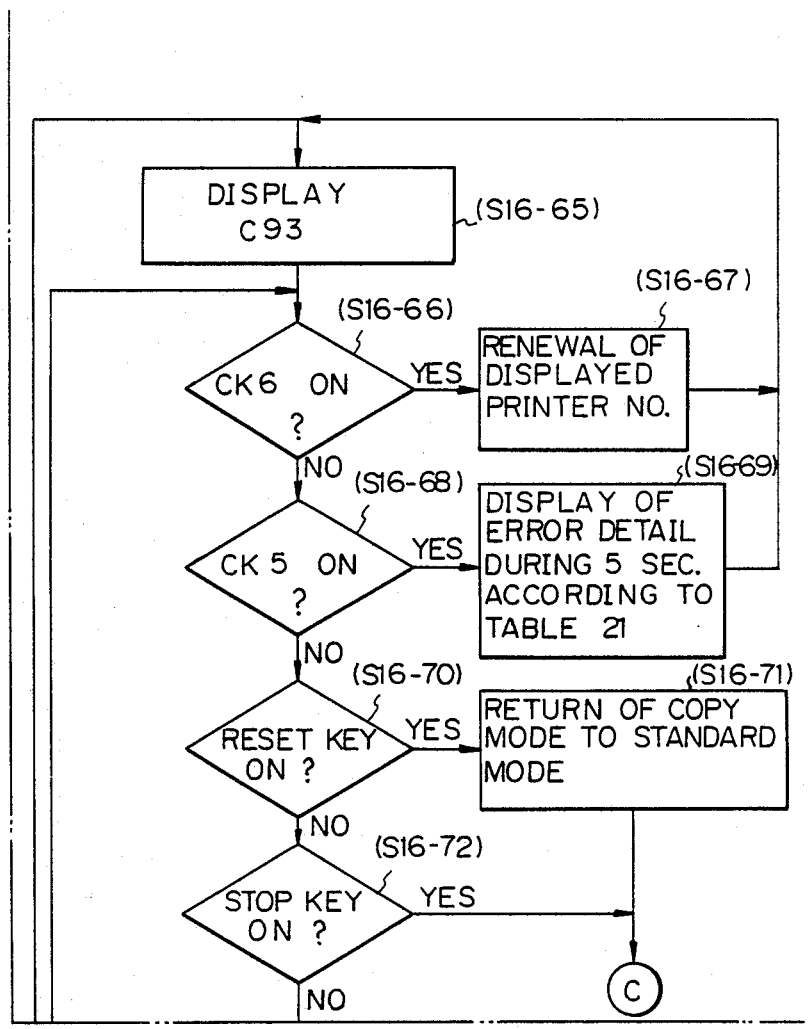
Figures 2, 4, 16:
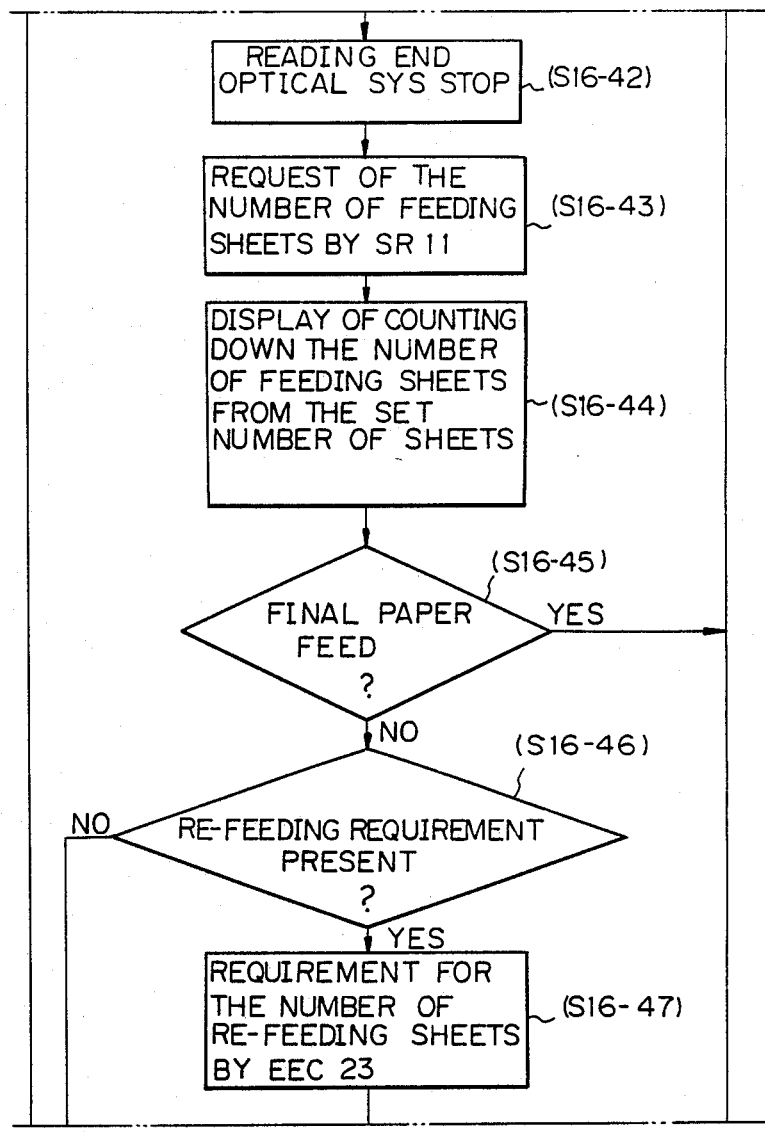
Figures 2, 5, 16:
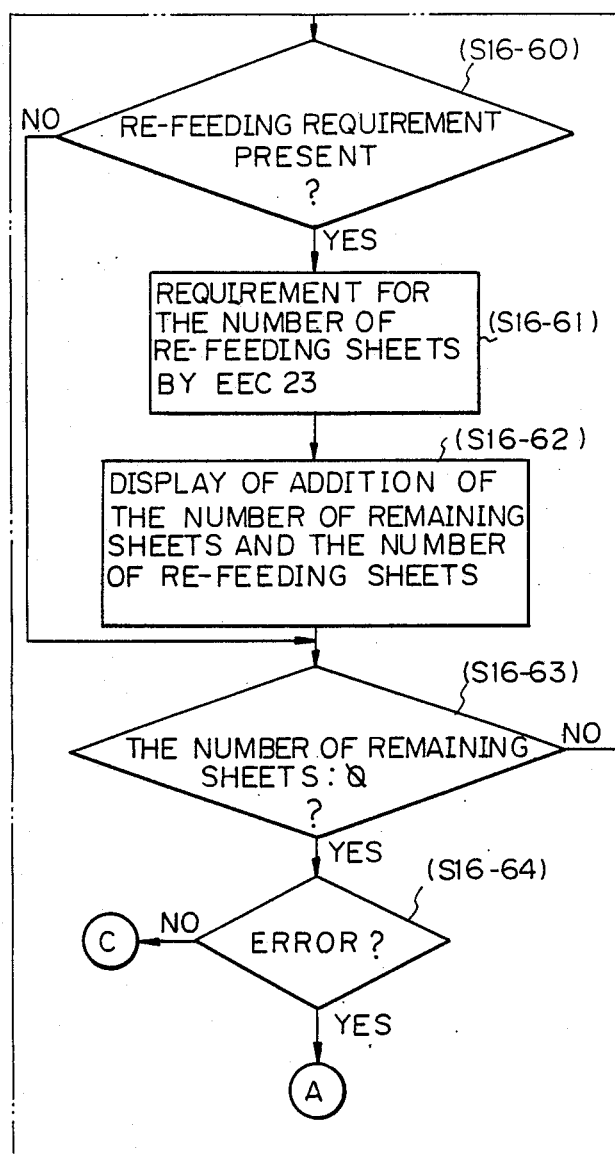
Figures 2, 6, 16:
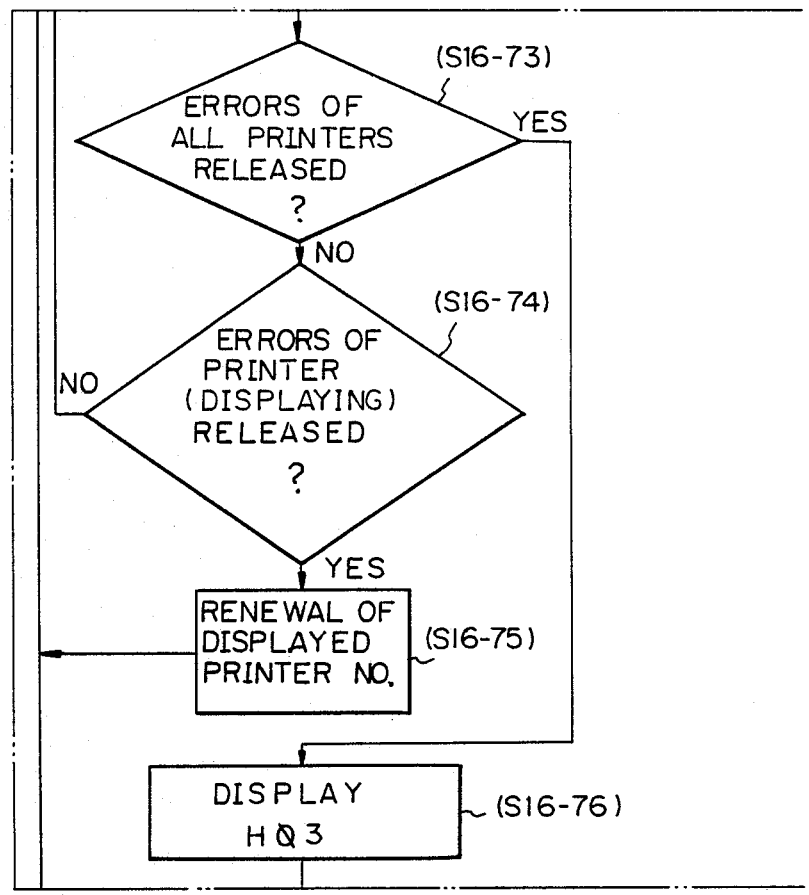
Figures 2, 7, 16:
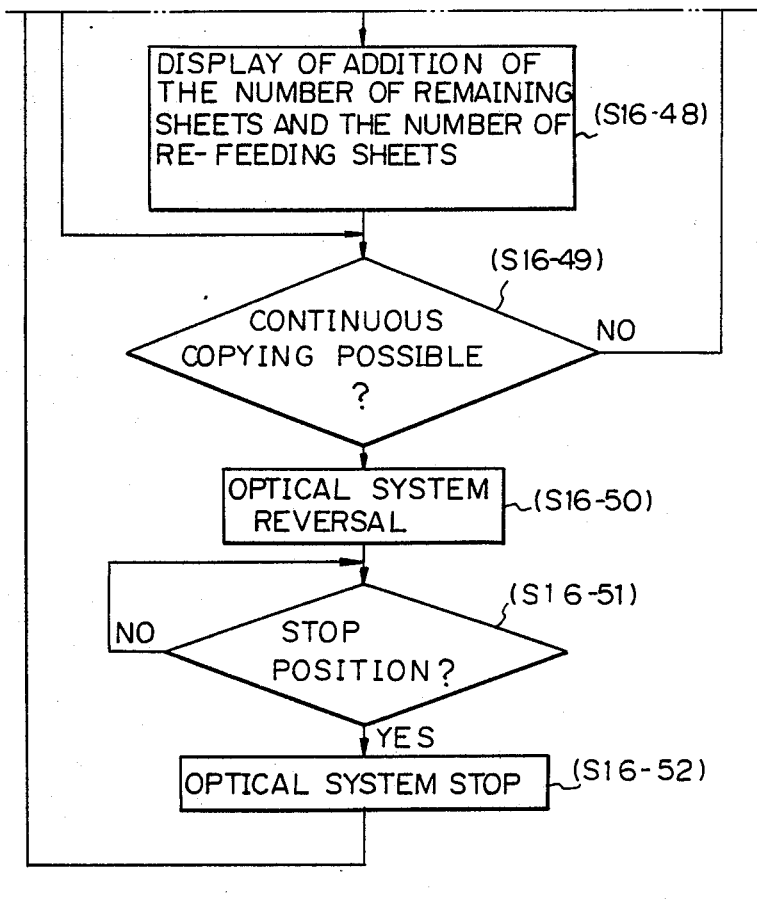
Figures 2, 8, 16:
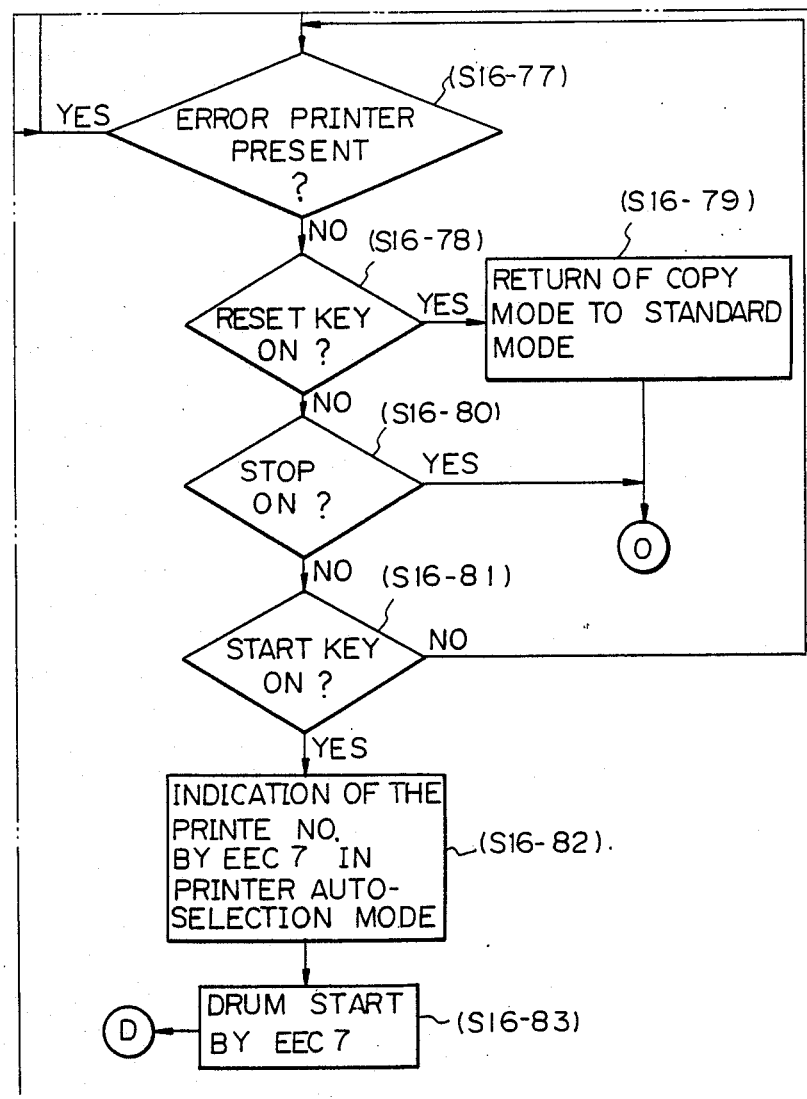

FIGS. 16-1 and 16-2 show control sequences of the reader in the multi mode. A description will be made hereinafter with reference to FIGS. 16-1 and 16-2.

When each of the various copy modes including the multi mode is set (S16-1) and the start key is depressed (S16-2) in the reader control section, the reader instructs the MCU the number of sheets by the "number of sheets" indication command EEC2 in Table 14 (S16-3), indicates the paper size by the paper size indication command EEC0 in Table 12 (S16-4), and indicates the printer number by the printer number indication command EEC1 in Table 13 (S16-5). At the same time, the mode for operating all the designated printers is signalled by setting bit 6 of the second byte of the printer number indication command EEC1 at "1" (S16-5). Thereafter, the MCU is initialized by the drum start command EEC7 in Table 15, and the mode for using the duplex unit or the sorter selected by the operator is indicated (S16-6). When the MCU receives these indications (S16-3 to S16-6) and performs checking availability of the printers in accordance of the flow of the MCU shown in FIG. 13, if it is determined that the operation mode set by the operator cannot be performed before the MCU starts the printers, a start error is signalled to the reader by the ECC 22 MCU information request command in Table 18 (S16-7). When there is no start error, when the reader starts copy operation. In response to a start error, the reader supplies a drum stop command of EC5 in Table 11 to the MCU to interrupt the copy operation (S18-8). Display is provided in accordance with the content of the start error. When the start error is one of the states from code "001" to code "110" in Table 19-2, the content is displayed for 5 seconds at the communication display 721 (S16-10 to S16-15), and C93 in FIG. 10-1 (1) is displayed to prompt the operator to release the error (S16-27).

Figures 1, 10:
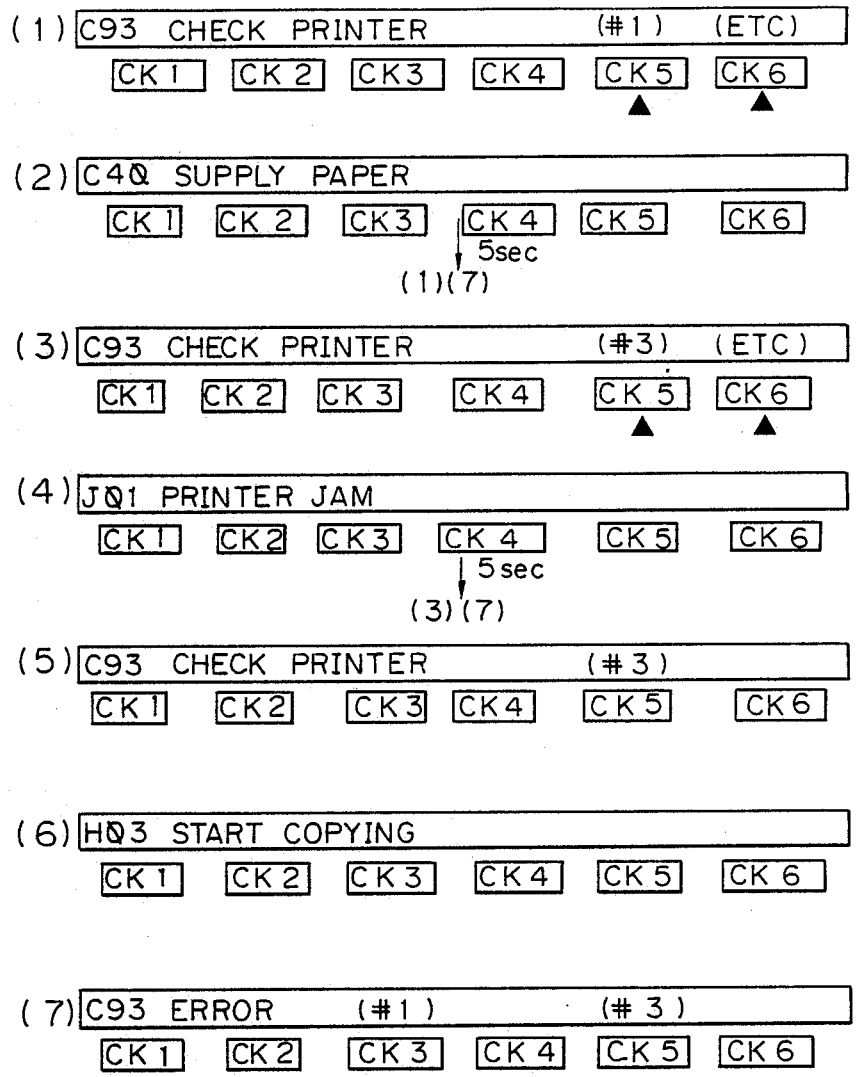

Since the operation when C93 is displayed has been described with reference to FIG. 10-1, a detailed description is omitted here. When the key CK6 is depressed in the display FIG. 10-1 (1) (S16-28), the number of another printer is displayed as shown in FIG. 10-1 (3) (S16-29). When the key CK5 is depressed in the display of FIG. 10-1 (1) or FIG. 10-1 (3) (S16-30), the error content of the printer whose number is displayed for 5 seconds as in FIG. 10-1 (2) or FIG. 10-1 (4), in accordance with Table 21, by means of an error message corresponding to the error code shown in Table 19-1 as a response to the MCU information request command of the ECC 22 in Table 18. Thereafter, C93 is displayed for the same printer number (S16-31).

However, when the reset key is depressed (S16-32), C93 display is cleared and all copy modes are restored to the standards (S16-33) and the flow returns to the normal inoperative mode. When the stop key is depressed (S16-34), C93 display is cleared and the flow enters the normal inoperative flow. When there is no key input for 10 seconds (S16-35), C93 display is cleared and the flow returns to the inoperative flow.

When "11-1" in Table 19-2 is returned as a start error code in step S16-9, H10 display is provided as in FIG. 10-2 (8) (S16-16). The H10 display indicates that at least one of the designated printers is not available due to an error or incompatible copy mode. Since the operation for providing H10 display has been described with reference to FIG. 10-2, a detailed description will be omitted.

When the key CK6 is depressed in the state FIG. 10-2 (8) (S16-17), the number of,another error printer is displayed as in FIG. 10-2 (12) (S16-18). However, when the key CK5 is depressed in the display shown in FIG. 10-2 (8) or FIG. 10-2 (10) (S16-19), details of the printer error are displayed for 5 seconds as in step S16-31 and H10 is displayed again (S16-20). However, when the stop key is depressed (S16-21), the H10 display is cleared and the flow returns to the normal flow. When the reset key is depressed (S16-22), the copy modes are returned to the standards, the H10 display is cleared, and the flow returns to the normal flow.

When the start key is depressed (S16-24), in order to perform copy operation by only available printers among the designated printers, the printer numbers are re-indicated by the printer number indication command EEC1 in Table 13. At the same time, the automatic printer selection mode wherein the MCU selects and starts available printers is signalled by setting to "1" the bit 6 of the second byte of the command EEC1 (S16-25). The drum start command is then supplied (S16-26).

When a start error is generated again (S16-7), the flow of step S16-9 and thereafter is performed. However, since automatic printer selection mode is selected this time, "111" in Table 19-2 is not set for the start error code. Since no start error is present, the flow goes to the copy operation (FIG. 16-2).

When all printers whose drums are started by the MCU are in the feedable state (S16-36), the reader supplies a paper feed command to the MCU and the MCU supplies a paper feed command to the printer (S16-37).

Thereafter, the reader starts forward movement of the optical system (S16-38). When the optical system reaches the front end of the original table (S16-39), image reading and image signal output are started (S16-40).

When the optical system reaches the reversal position (S16-41), image reading and image signal output are stopped (S16-42). Thereafter, information as to how many printers receive a paper feed command from the MCU in response to a paper feed command sent from the reader to the MCU in step S16-39 is requested by the number of sheets command SR11 in Table 1 (S16-43).

When the reader operates one printer, one sheet is fed in response to a paper feed command from the reader and therefore step S16-43 is not necessary. Instead, every time a sheet is fed, the count is decremented and displayed. However, when a plurality of printers are operated (S16-43), the difference obtained by subtracting the number of sheets in step S16-43 from the set number of sheets is displayed at the display 707 (S16-44). This number indicates the number of remaining copies to be produced.

When data representing a final sheet is sent from the MCU by bit 6 of the number of sheets status in Table 8 in response to the command SR11 in Table 1 in step S16-43, the reader starts post-copy processing after step S16-53 (S16-45). When the current sheet is not a final sheet (S16-45) and a re-feed request is sent from the MCU by bit 5 of the "number of sheets" status in Table 8 (S16-46), the reader requests to the MCU the number of re-feeding sheets by the MCU number of re-feeding sheets request command EEC23 in Table 20 (S16-47). The obtained number of re-feeding sheets is added to the number of remaining sheets in step S16-44, and the sum is displayed. The displayed number is the updated number of remaining sheets (S16-48). Steps S16-46 to S16-48 are performed only in the automatic recovery mode described above.

It is then checked if the next copy operation can be performed in accordance with the MCU information status (S16-49). When the automatic recovery mode is selected, the copy operation can be performed until all the printers which have been started cause an error. When the automatic recovery mode is not selected, the copy operation can be performed until each designated printer completes copying of an assigned number of sheets or fails before completing copying an assigned number of sheets due to an error.

When all the designated printers fail in the automatic recovery mode or when at least one designated printer fails and all remaining designated printers complete copying of the assigned number of sheets in the automatic recovery mode, post-processing from step S16-49 o S16-53 is performed. If the copy operation can be continued, the optical system is reversed from step S16-

50 to step S16-52 and returned to a predetermined stop position, and the copy operation after step S16-36 is resumed.

When the preset number of copies has been produced in step S16-45 or when the copy operation cannot be continued due to an error in step S16-49, the optical system is returned to a predetermined position and a drum stop is instructed by the command EC5 in Table 11 (S16-53 to S16-55) and the MCU and printer are stopped (S16-56). Thereafter, the MCU status is acquired by the MCU information request command ECC 22 in Table 18 (S16-57), while completion of the paper sheets is monitored by bit 5 of the first byte (S16-58). When paper feeding is completed, the number of error printer is acquired by the error printer number request command SR13 in Table 1 (S16-59). When it is determined in accordance with bit 6 of the first byte of the MCU status acquired in step S16-57 in step S16-50 that paper sheets must be re-fed, the number of re-feeding sheets is acquired by the "MCU number of re-feeding sheets" request command EEC23 in Table 20. The number of re-feeding sheets is added to the number of current remaining sheets, and the sum is displayed at the display 707 as the number of remaining sheets (S16-62). When the sum is 0, it is determined that preset number of copies have been produced (S16-63). If there is an error even if the preset number of copies have been produced (S16-64), the error is displayed in accordance with the flow of step S16-27 and thereafter and the flow returns to the normal flow. If there is no error, the flow directly returns to the normal flow.

When it is determined in step S16-63 that the preset number of copies have not been produced, since an error is present in a printer C93 display is provided as in FIG. 10-1 (1) in accordance with the error printer number obtained in step S16-59 (S16-65). Since processing from step S16-66 to step S16-72 is the same as that in step S16-28 to step S16-34, a detailed description is omitted. When there is no effective key input upon providing C93 display, it is checked if all errors in the designated printers have been released (S16-73). If not all errors have been released, it is checked if the error of the printer whose number is currently displayed in released (S16-74). If YES in step S16-74, the number of another error printer is displayed (S16-95).

When all errors of the designated printers have been released, H03 display is provided as in FIG. 10-1 (6), indicating to the operator that the copy operation can be resumed (S16-76). When an error occurs again after H03 is displayed (S16-77), the flow returns to S16-65 and C93 is displayed. When there is no error printer and the reset key is depressed (S16-78), H03 display is cleared and the flow returns to the normal flow (S16-99). However, when the stop key is depressed, H03 display is cleared and the flow returns to the normal flow. When the start key is depressed, the printer number is indicated to the MCU by the command EEC1 in Table 13, and the fact that the automatic printer selection mode is selected is signalled as described with reference to step S16-25 (S16-82). Thereafter, the MCU is started by the drum start command of EEC7 in Table 15 (S16-83) and the copy operation is resumed.

An example of the display at the communication display 721 will be described in detail with reference to FIG. 10-1 and to the case wherein an error occurs in the multi mode copy operation and the reader stops operating.

Assume that the copy operation is performed by the reader #1 and printers #1, #2 and #3. When the printer #3 causes paper jam, a display as shown in FIG. 10-1 (1) is provided on the communication display 721. The display in FIG. 10-1 (1) warns to the operator that an error has occurred at the printer #1. When the key CK5 corresponding to "#1" is depressed in the display shown in FIG. 10-1 (1), the display is updated to that shown in FIG. 10-1 (2) t inform the operator that the error at the printer #1 is no paper and paper must be replenished. This display is provided for 5 seconds and the display thereafter returns to that shown in FIG. 10-1 (1). The 5 seconds are only an example, and can be shortened or prolonged as needed. When a key is depressed in the state in FIG. 10-1 (2), the display also returns to that shown in FIG. 10-1 (1).

"ETC" in the display in FIG. 10-1 (1) indicates that an error has occurred in a printer other than the printer #1. When the key CK6 corresponding to "ETC" is depressed in the state shown in FIG. 10-1 (1), the display is updated to that shown in FIG. 10-1 (3). When the key CK5 corresponding to "#3" is depressed as in the case of FIG. 10-1 (1), the display is updated to that shown in FIG. 10-1 (4) to inform the operator that a paper jam has occurred at the printer #3.

The display in FIG. 10-1 (4) is provided for 5 seconds. When a key is input, the flow returns to that shown in FIG. 10-1 (3). When the key CK6 corresponding to "ETC" is depressed in the state shown in FIG. 10-1 (3), since no error is present other than the printers #1 and #3, the display returns to that shown in FIG. 10-1 (1).

When the error details at the printers #1 and #3 are confirmed and paper sheets are replenished at the printer #1, e.g., the display is updated to that shown in FIG. 10-1 (5). The display in FIG. 10-1 (5) indicates that an error has occurred at the printer #3 as in the case of the display in FIG. 10-1 (3). However, unlike the case of the display in FIG. 10-1 (3), since error processing of the printer #1 has been performed and an error is present in only the printer #3 and in no other printers, "ETC" is not displayed. When an error occurs in the printer #1 again in the state shown in FIG. 10-1 (5), the display is updated to that shown in FIG. 10-1 (3) again.

When a paper jam of the printer #3 is released in the state shown in FIG. 10-1 (5), the display is updated to that shown in FIG. 10-1 (6) to communicate that the copy operation can be resumed. When the start key is depressed, the copy operation is resumed. When the printer #1 or #3 causes an error again in the state shown in FIG. 10-1 (6), the display returns to one of the states shown in FIGS. 10-1 (1), 10-1 (3) and 10-1 (5).

Instead of the displays as in FIGS. 10-1 (1) and 10-1 (3), errors at the printers #1 and #3 can be simultaneously displayed as in FIG. 10-1 (7). In the case of FIG. 10-1 (7), when the key CK3 or CK5 is depressed, the error detail is displayed as in FIGS. 10-1 (2) or 10-1 (4). In the case of FIG. 10-1 (7), if an error occurs at the printer #2 or #4, "#2" can be displayed above the key CK4 or "#4" can be displayed above the key CK6. If there is no error in the state shown in FIG. 10-1 (7), the display is updated to that shown in FIG. 10-1 (6) and the copy operation can be performed when the operator depresses the start key.

When the stop key is depressed while C93 in FIG. 10-1 is displayed, the copy operation is stopped. When the reset key is depressed, the copy operation is stopped and all the copy modes are returned to the standard modes.

In FIG. 10-1, no paper and paper jam are exemplified as printer errors. However, error details at respective printers can be displayed as messages as in Table 21 in correspondence with the printer error codes in Tables 19-1 and 19-2. In this manner, errors at the printers being operated are displayed at the display unit of the reader, and the operator can easily control a plurality of printers. When the communication display is used as described above, even if the number of printers is increased or the number of types of errors is increased, the single control can be used to process such errors at a single display unit.

FIG. 10-2 shows a case wherein the printers #2 and #4 are unavailable when the operator designates the printers #1, #2, #3 and #4 from the reader #1 and depresses the start key. When a start error indicating at least one of the designated printers is unavailable is sent from the MCU in accordance with the process described previously, the reader #1 provides a display in FIG. 10-2 (8) on the CD so as to prompt the operator to restart the operation or release the error. In the display shown in FIG. 10-2 (8), "#2" and "ETC" indicate that the printer #2 has an error and another printer has an error. This is the same as has been described with reference to C93 in FIGS. 10-1 (1) or 10-1 (3). A difference between the states "H10" and "C93" in FIG. 10-2 (8) is that in the state "C93" the start key cannot be accepted unless all the printer errors are released, while in the state "H10" the start key is accepted if at least one printer is available.

When the key CK5 corresponding to #2 is depressed in the state shown in FIG. 10-2 (8), since the door of the printer #2 is open, for example, the need for closing is displayed. After 5 seconds, the display returns to that shown in FIG. 10-2 (8). When the key CK6 below "ETC" is depressed in this state, the number "#4" of the other printer is displayed. When the key CK5 is depressed in the state shown in FIG. 10-2 (10), the fact that the printer #4 is being used by a reader other than the reader #1 is displayed. After 5 seconds, the state returns to that shown in FIG. 10-2 (10).

Display "C08" in FIG. 10-2 (11) will be described below.

In a system using a plurality of readers and a plurality of printers as in this embodiment, since a single printer can be used by a plurality of readers, there may be cases wherein an error occurs in a printer and this printer is not available and wherein a printer is used by another reader and is not available although this printer does not have an error. Display "C08" in FIG. 10-2 (11) is an example of a message necessarily used to signal this latter case to the operator.

When the operator confirms the error content of the printer #2 by the display in FIG. 10-2 (9) and closes the door of the printer #2, the error of the printer #2 is released and the display in FIGS. 10-2 (8) or 10-2 (10) is updated to that shown in FIG. 10-2 (12). When the operator decides not to use the printer #4 and depresses the start key, the copy operation can be performed using three printers #1, #2, and #3. When the start key is depressed after the printer #4 is no longer used by the other reader, the copy operation is performed using the printers #1, #2, #3 and #4.

FIGS. 9-1, 9-2 and 9-3 show examples of assignment of the number of sheets in different modes of the application unit when a plurality of printers are used.

Figures 1, 9:
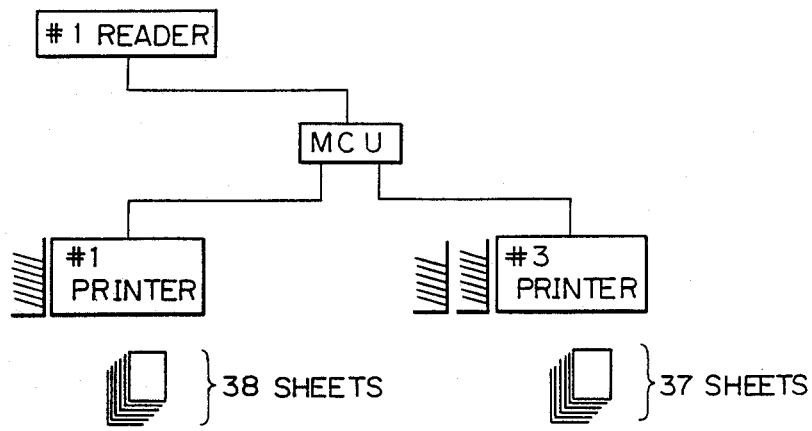
Figures 2, 9:
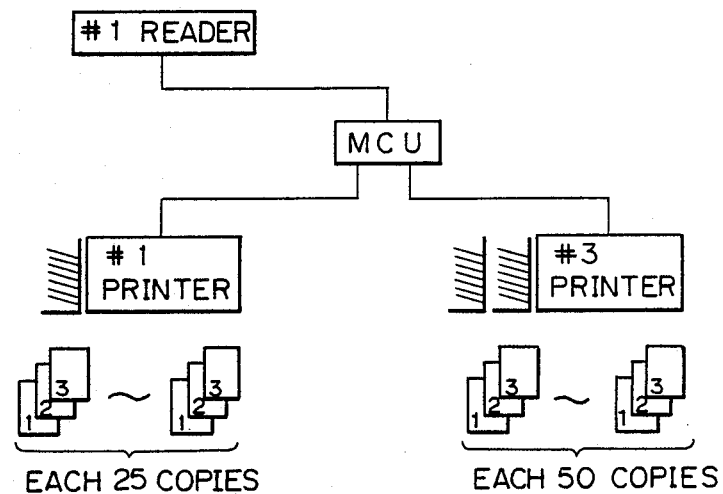

FIG. 9-1 shows a case when 75 copies are made in the non-sort mode using a printer #1 having one sorter and a printer #3 having two sorters. In this case, the MCU receives the information 75 as the number of sheets. Since the non-sort mode is selected, in order to shorten the copy time, 38 sheets are assigned to the printer #1 and 37 sheets are assigned to the printer #3. Note that 38 sheets may be assigned to the printer #3 and 37 sheets may be assigned to the printer #1.

FIG. 9-2 shows a case wherein 75 copies are produced by printers #1 and #3, 3 originals are present, and the sort mode is selected. In this case, the printer #1 has one sorter and can sort 25 copies, and the printer #3 has two sorters and sort 50 copies. Therefore, the MCU assigns, for each of the three originals, 25 sheets to the printer #1 and 50 sheets to the printer #3. The copy operation is performed in the sort mode.

When the MCU performs assignment of the number of sheets in accordance with sorters connected to the respective printers and the sorter modes, optimal copy operation required by the operator can be performed.

Figure 3:
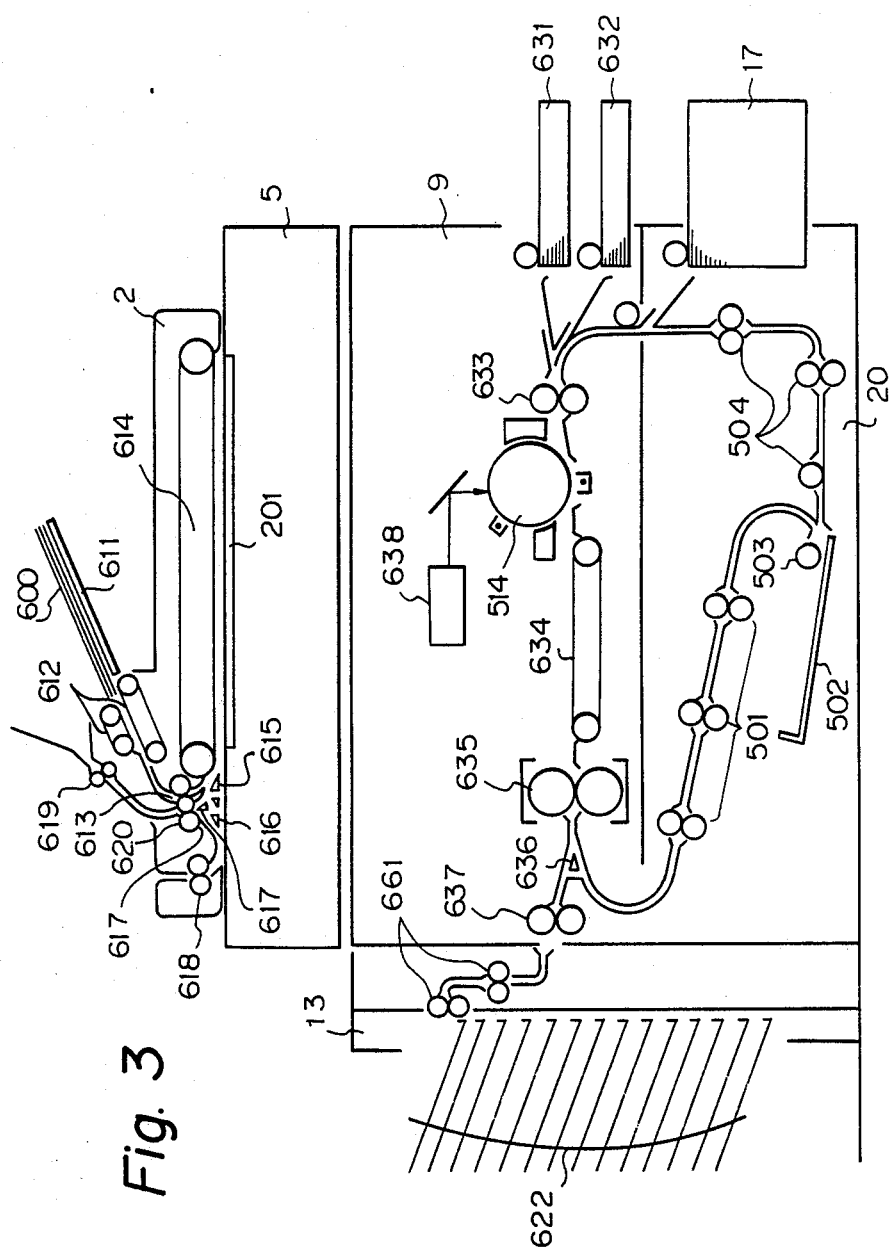
FIG. 3 shows a convey path of paper in a reader, a printer, a duplex unit and a sorter.

FIG. 9-3 shows a case wherein a printer #4 having no sorter is handled as a 1-bin sorter. Assume that the reader #1 selects three printers: printers #1 and #2 each having one sorter and a printer #4 having no sorter, 3 originals are present, and 51 copies are to be produced. Since the printer #4 does not have a sorter, the MCU determines that the sort mode cannot be selected and wants to start copying with the printers #1 and #2. However, since the printers #1 and #2 have only one sorter, a total of only 50 copies can be produced. Therefore, the MCU signals to the reader #1 that 51 copies cannot be produced. The reader #1 displays a message C83 in Table 22 on the communication display and stops the copy operation. The operator must reset the copy number to 50 and re-depress the start key.

However, if the printer #4 is considered as a sorter having one bin, 25 copies can be assigned to each of the printers #1 and #2 and 1 copy can be assigned to the printer #4 in the above case and re-setting operation of the operator need not be performed in this case.

When an abnormality occurs in one or more printers, the display at the reader displays the contents of all abnormalities. Therefore, the operator can easily confirm the contents of abnormality when the system stops operating due to an error and can immediately release the error.

The display at the reader can display sizes of sheets stored in one or more printers selected by the reader. Therefore, the sizes of all the printers designated by the operator can be easily confirmed by the operator, and the operator can select any available size as needed.

As described above, an image processing system of the present invention has a reader for supplying an image signal, and a plurality of printers for forming images on a recording medium based on the image signal from the reader. One or more printers are selected for a desired image formation mode automatically. Therefore, optimal copy operation can be automatically performed without extra setting operation by the operator.

When a plurality of printers have sorters and the printers together produce a plurality of copies, the number of copies to be produced by each printer is assigned in accordance with the capacity of sorter connected to each printer. Therefore, high-speed copying and efficient sorting can be performed.

When aplurality of printers performing a copy operation cause errors except for at least one printer, the first mode for continuing copying by other printers and the second mode for not continuing copying by other printers are selectively performed in accordance with the selected copy mode. Therefore, effective and efficient countermeasure is taken when an error occurs during copy operation and a further problem by improper error recovery can be prevented.

The first mode for performing no copy operation when all of a plurality of designated printers are not available, and the second mode for performing copy operation if at least one of a plurality of designated printers is available are provided. Predetermined instructions can be given, to switch from one to the other of these modes. Therefore, high-speed operation can be performed and at the same time a specific copy operation requested by an operator can be performed reliably.

The image processing system of the present invention has printers which selectively fetch image signals supplied from a plurality of readers. When a given printer is not available for use by a given reader due to an error or for use by another reader, supply of the image signal to the given printer by the given reader is not performed and the cause of unavailability is checked and signalled to the reader. Therefore, a plurality of readers can be effectively utilized. When any printer is not available, the cause for this can be clearly determined and a proper countermeasure can be taken immediately.

Although the present invention has been described with reference to particular embodiments, the present invention is not limited to these embodiments. For example, the number of readers or printers connected to an MCU is not limited to 4, and the number of readers or printers to be connected to the MCU can be easily changed by slightly changing the units in the MCU and the control program stored therein.

A unit for supplying image data to the MCU need not be a document reader, and an image file electrically storing image data or a work station for performing image processing by the conversational processing can be connected. A processing unit for processing image information from the MCU need not be a printer, and an image file, a work station or other type of image processing system can also be connected.

TABLE 1

| Symbol | Description | Code | Status |
|---|---|---|---|
| SR 0 | OVERALL STATUS REQUEST | 01H | Table 2 |
| SR 1 | OPERATOR CALL ERROR DETAIL REQUEST | 02H | Table 3 |
| SR 2 | SERVICE CALL ERROR DETAIL REQUEST | 04H | Table 4 |
| SR 5 | LOWER CASSETTE PAPER SIZE REQUEST | 0BH | Table 5 |
| SR 6 | UPPER CASSETTE PAPER SIZE REQUEST | 0DH | Table 5 |
| SR 7 | APPLICATION REQUEST 1 | 0EH | Table 6 |
| SR 8 | ERROR UNIT REQUEST | 10H | Table 7 |
| SR 9 | PAPER DECK PAPER SIZE REQUEST | 13H | Table 5 |
| SR 11 | NO. OF FEEDING SHEETS REQUEST | 16H | Table 8 |
| SR 13 | ERROR PRINTER NO. REQUEST | 1AH | Table 9 |
| SR 21 | PRINTER PAPER PRESENCE/ABSENCE REQUEST | 2AH | Table 10 |

(*H: HEXADECIMAL)

TABLE 2

| bit 7 | 0 |
|---|---|
| bit 6 | 0 |
| bit 5 | IN CONVEYING |
| bit 4 | 0 |
| bit 3 | PRINTER FIXING UNIT IN WAITING |
| bit 2 | 0 |
| bit 1 | ERROR PRESENT |
| bit 0 | PARITY BIT |

TABLE 3

| bit 7 | 0 |
|---|---|
| bit 6 | NO TONER |
| bit 5 | EXHAUSTED TONER OVERFLOW |
| bit 4 | NO PAPER |
| bit 3 | PAPER JAM |
| bit 2 | PRINTER DOOR OPEN |
| bit 1 | UNKNOWN |
| bit 0 | PARITY BIT |

TABLE 4

| bit 7 | 0 |
|---|---|
| bit 6 | FIXING UNIT ERROR |
| bit 5 | BD ERROR |
| bit 4 | SCANNER ERROR |
| bit 3 | PELTIER ERROR |
| bit 2 | DRUM MOTOR ERROR |
| bit 1 | NO COUNTER |
| bit 0 | PARITY BIT |

TABLE 5

| bit 7 | 0 |
|---|---|
| bit 6 | PAPER SIZE bit 5 |
| bit 5 | PAPER SIZE bit 4 |
| bit 4 | PAPER SIZE bit 3 |
| bit 3 | PAPER SIZE bit 2 |
| bit 2 | PAPER SIZE bit 1 |
| bit 1 | PAPER SIZE bit 0 |
| bit 0 | PARITY BIT |

TABLE 6

| bit 7 | 0 |
|---|---|
| bit 6 | PRINTER CONNECTED |
| bit 5 | MCU CONNECTED |
| bit 4 | DUPLEX UNIT CONNECTED |
| bit 3 | SORTER CONNECTED |
| bit 2 | 0 |
| bit 1 | 0 |
| bit 0 | PARITY BIT |

TABLE 7

| bit 7 | 0 |
|---|---|
| bit 6 | PRINTER |
| bit 5 | DUPLEX UNIT ERROR |
| bit 4 | OUTPUT PORT ERROR |
| bit 3 | 0 |
| bit 2 | 0 |
| bit 1 | 0 |
| bit 0 | PARITY BIT |

TABLE 8

| bit 7 | 0 |
|---|---|
| bit 6 | FINAL PAPER |
| bit 5 | RE-FEEDING REQUEST PRESENT |
| bit 4 | NO. OF FEEDING SHEETS bit 3 |
| bit 3 | NO. OF FEEDING SHEETS bit 2 |
| bit 2 | NO. OF FEEDING SHEETS bit 1 |
| bit 1 | NO. OF FEEDING SHEETS bit 0 |
| bit 0 | PARITY BIT |

TABLE 9

| bit 7 | 0 |
|---|---|
| bit 6 | 0 |
| bit 5 | 0 |
| bit 4 | PRINTER 4 ERROR PRESENT |
| bit 3 | PRINTER 3 ERROR PRESENT |
| bit 2 | PRINTER 2 ERROR PRESENT |
| bit 1 | PRINTER 1 ERROR PRESENT |
| bit 0 | PARITY BIT |

TABLE 10

| bit 7 | 0 |
|---|---|
| bit 6 | UPPER CASSETTE PAPER PRESENT (PRESENT: 1) |
| bit 5 | LOWER CASSETTE PAPER PRESENT |
| bit 4 | PAPER DECK PAPER PRESENT |
| bit 3 | INTERMEDIATE TRAY PAPER PRESENT |
| bit 2 | 0 |
| bit 1 | 0 |
| bit 0 | PARITY BIT |

TABLE 11

| Symbol | Description | Code | Status |
|---|---|---|---|
| EC 5 | DRUM STOP | 4AH | Table 2 |
| EC 8 | LOWER CASSETTE PAPER FEED INDICATION | 51H | Table 2 |
| EC 9 | UPPER CASSETTE PAPER FEED INDICATION | 52H | Table 2 |
| EC 10 | PAPER DECK PAPER FEED INDICATION | 54H | Table 2 |

TABLE 12

| Command | Status |
|---|---|

EEC 0. PAPER SIZE INDICATION
1ST BYTE

MSB

| 1 | 0 | 0 | 0 | 0 | 0 | 0 | 0 |
|---|---|---|---|---|---|---|---|

OVERALL STATUS

2ND BYTE

| bit 7 | 0 |
|---|---|
| bit 6 | PAPER SIZE bit 5 |
| bit 5 | PAPER SIZE bit 4 |
| bit 4 | PAPER SIZE bit 3 |
| bit 3 | PAPER SIZE bit 2 |
| bit 2 | PAPER SIZE bit 1 |
| bit 1 | PAPER SIZE bit 0 |
| bit 0 | PARITY BIT |

OVERALL STATUS

TABLE 13

| Command | Status |
|---|---|

EEC 1. PRINTER NO. INDICATION
1ST BYTE

MSB

| 1 | 0 | 0 | 0 | 0 | 0 | 1 | 1 |
|---|---|---|---|---|---|---|---|

OVERALL STATUS

2ND BYTE

TABLE 13-continued

| Command | Status |
|---|---|

| bit 7 | 0 |
|---|---|
| bit 6 | AUTOMATIC PRINTER SELECTION |
| bit 5 | 0 |
| bit 4 | PRINTER NUMBER 4 |
| bit 3 | PRINTER NUMBER 3 |
| bit 2 | PRINTER NUMBER 2 |
| bit 1 | PRINTER NUMBER 1 |
| bit 0 | PARITY BIT |

OVERALL STATUS

TABLE 14

| Command | Status |
|---|---|

EEC 2. NO. OF FEEDING SHEETS
INDICATION
1ST BYTE

MSB

| 1 | 0 | 0 | 0 | 0 | 1 | 0 | 1 |
|---|---|---|---|---|---|---|---|

OVERALL STATUS

2ND BYTE

| bit 7 | 0 |
|---|---|
| bit 6 | NO. OF FEEDING SHEETS bit 5 |
| bit 5 | NO. OF FEEDING SHEETS bit 4 |
| bit 4 | NO. OF FEEDING SHEETS bit 3 |
| bit 3 | NO. OF FEEDING SHEETS bit 2 |
| bit 2 | NO. OF FEEDING SHEETS bit 1 |
| bit 1 | NO. OF FEEDING SHEETS bit 0 |
| bit 0 | PARITY BIT |

OVERALL STATUS

3RD BYTE

| bit 7 | 0 |
|---|---|
| bit 6 | 0 |
| bit 5 | 0 |
| bit 4 | NO. OF FEEDING SHEETS bit 9 |
| bit 3 | NO. OF FEEDING SHEETS bit 8 |
| bit 2 | NO. OF FEEDING SHEETS bit 7 |
| bit 1 | NO. OF FEEDING SHEETS bit 6 |
| bit 0 | PARITY BIT |

OVERALL STATUS

TABLE 15

| Command | Status |
|---|---|

EEC. 7 DRUM START
1ST BYTE

MSB

| 1 | 0 | 0 | 0 | 1 | 1 | 0 | 0 |
|---|---|---|---|---|---|---|---|

OVERALL STATUS

2ND BYTE

| bit 7 | 0 |
|---|---|
| bit 6 | 0 |
| bit 5 | RECOVERY MODE |
| bit 4 | AUTOMATIC PAPER SELECTION |
| bit 3 | DRUM START bit 2 |
| bit 2 | DRUM START bit 1 |
| bit 1 | DRUM START bit 0 |
| bit 0 | PARITY BIT |

OVERALL STATUS

3RD BITE

TABLE 15-continued

| Command | Status |
|---|---|
| bit 7   0 | OVERALL STATUS |
| bit 6   SORTER INDICATION bit 2 | |
| bit 5   SORTER INDICATION bit 1 | |
| bit 4   SORTER INDICATION bit 0 | |
| bit 3   0 | |
| bit 2   0 | |
| bit 1   0 | |
| bit 0   PARITY BIT | |

TABLE 16

| Command | Status |
|---|---|
| ECC 0. PRINTER INFORMATION REQUEST | |
| 1ST BYTE | |
| MSB | |
| 1 1 0 0 0 0 0 1 | 0 0 0 0 0 0 0 1 |
| | |
| 2ND BYTE | |
| bit 7   0 | bit 7   0 |
| bit 6   ACCESSORY REQUEST | bit 6   PRINTER INFORMATION bit 1 |
| bit 5   0 | bit 5   PRINTER INFORMATION bit 0 |
| bit 4   PRINTER 4 INDICATION | bit 4   PRINTER OPERATING |
| bit 3   PRINTER 3 INDICATION | bit 3   MY PRINTER |
| bit 2   PRINTER 2 INDICATION | bit 2   0 |
| bit 1   PRINTER 1 INDICATION | bit 1   0 |
| bit 0   PARITY BIT | bit 0   PARITY BIT |

TABLE 17

| Command | Status |
|---|---|
| ECC 6. OUTPUT SECTION CONFIGURATION STATUS REQUEST | |
| 1ST BYTE | |
| 1 1 0 0 1 0 1 1 | bit 7   0 |
| | bit 6   UNKNOWN |
| | bit 5   UNKNOWN |
| | bit 4   OUTPUT SECTION NUMBER bit 3 |
| | bit 3   OUTPUT SECTION NUMBER bit 2 |
| | bit 2   OUTPUT SECTION NUMBER bit 1 |
| | bit 1   OUTPUT SECTION NUMBER bit 0 |
| | bit 0   PARITY BIT |
| 2ND BYTE | |
| 0 0 0 0 0 0 0 1 | bit 7   0 |
| | bit 6   OUTPUT SECTION BIN NUMBER bit 5 |
| | bit 5   OUTPUT SECTION BIN NUMBER bit 4 |
| | bit 4   OUTPUT SECTION BIN NUMBER bit 3 |
| | bit 3   OUTPUT SECTION BIN NUMBER bit 2 |
| | bit 2   OUTPUT SECTION BIT NUMBER bit 1 |
| | bit 1   OUTPUT SECTION BIN NUMBER bit 0 |
| | bit 0   PARITY BIT |

TABLE 18

| Command | Status |
|---|---|
| ECC 22 MCU INFORMATION REQUEST <br> 1ST BYTE <br> `[1\|1\|1\|0\|1\|1\|0\|0]` | bit 7: 0 <br> bit 6: RE-FEEDING PRESENT <br> bit 5: PAPER CONVEYING <br> bit 4: 0 <br> bit 3: START ERROR bit 2 <br> bit 2: START ERROR bit 1 <br> bit 1: START ERROR bit 0 <br> bit 0: PARITY |
| 2ND BYTE <br> `[0\|0\|0\|0\|0\|0\|0\|1]` | `[0\|x\|x\|x\|x\|x\|x\|P]` <br> PRINTER 1 ERROR    PARITY BIT |
| 3rd BYTE <br> `[0\|0\|0\|0\|0\|0\|0\|1]` | `[0\|x\|x\|x\|x\|x\|x\|P]` <br> PRINTER 2 ERROR |
| 4TH BYTE <br> `[0\|0\|0\|0\|0\|0\|0\|1]` | `[0\|0\|x\|x\|x\|x\|x\|P]` <br> PRINTER 3 ERROR |
| 5TH BYTE <br> `[0\|0\|0\|0\|0\|0\|0\|1]` | `[0\|x\|x\|x\|x\|x\|x\|P]` <br> PRINTER 4 ERROR |

TABLE 19-1

| Bit 6 | 5 | 4 | 3 | 2 | 1 | Description |
|---|---|---|---|---|---|---|
| 0 | 0 | 0 | 0 | 0 | 0 | NO ERROR |
| 0 | 0 | 0 | 0 | 1 | 0 | NO PRINTER |
| 0 | 0 | 0 | 0 | 1 | 1 | PRINTER POWER OFF |
| 0 | 0 | 0 | 1 | 0 | 0 | USED BY OTHER READER |
| 0 | 0 | 0 | 1 | 0 | 1 | FIXING UNIT ERROR |
| 0 | 0 | 0 | 1 | 1 | 0 | BD ERROR |
| 0 | 0 | 0 | 1 | 1 | 1 | SCANNER ERROR |
| 0 | 0 | 1 | 0 | 0 | 0 | PEITIER ERROR |
| 0 | 0 | 1 | 0 | 0 | 1 | DRUM MOTOR ERROR |
| 0 | 0 | 1 | 0 | 1 | 0 | NO COUNTER |
| 0 | 0 | 1 | 0 | 1 | 1 | DUPLEX UNIT HOME POSITION ERROR |
| 0 | 0 | 1 | 1 | 0 | 0 | SORTER STANDBY ERROR |
| 0 | 0 | 1 | 1 | 0 | 1 | MISPRINT |
| 0 | 0 | 1 | 1 | 1 | 0 | DOUBLE FEEDING |
| 0 | 0 | 1 | 1 | 1 | 1 | PRINTER JAM |
| 0 | 1 | 0 | 0 | 0 | 0 | SORTER JAM |
| 0 | 1 | 0 | 0 | 0 | 1 | PRINTER + SORTER JAM |
| 0 | 1 | 0 | 0 | 1 | 0 | NO TONER |
| 0 | 1 | 0 | 0 | 1 | 1 | EXHAUSTED TONER OVERFLOW |
| 0 | 1 | 0 | 1 | 0 | 0 | OUTPUT SECTION DOOR OPEN |
| 0 | 1 | 0 | 1 | 0 | 1 | DEVELOPPING UNIT DOOR OPEN |
| 0 | 1 | 0 | 1 | 1 | 0 | NO DEVELOPPING UNIT |
| 0 | 1 | 0 | 1 | 1 | 1 | DUPLEX UNIT DOOR OPEN |
| 0 | 1 | 1 | 0 | 0 | 0 | SORTER DOOR OPEN |
| 0 | 1 | 1 | 0 | 0 | 1 | WAIT |
| 0 | 1 | 1 | 0 | 1 | 0 | NO PAPER |
| 0 | 1 | 1 | 0 | 1 | 1 | INTERMEDIATE TRAY PAPER PRESENT |
| 0 | 1 | 1 | 1 | 0 | 0 | NO SHEET OF SELECTED SIZE |
| 0 | 1 | 1 | 1 | 0 | 1 | NO DUPLEX UNIT IN BOTH COPY MODE |
| 0 | 1 | 1 | 1 | 1 | 0 | NO SORTER IN SORT MODE |
| 1 | 1 | 1 | 1 | 1 | 1 | NOT DETERMINED |

TABLE 19-2

| Bit 3 | 2 | 1 | Contents |
|---|---|---|---|
| 0 | 0 | 0 | NO START ERROR |
| 0 | 0 | 1 | NO DESIGNATED PRINTER AVAILABLE |
| 0 | 1 | 0 | NO PRINTER WITH DUPLEX UNIT AVAILABLE IN DUPLEX UNIT MODE |
| 0 | 1 | 1 | NO PRINTER WITH SORTER AVAILABLE IN SORTER MODE |
| 1 | 0 | 0 | NO PRINTER STORING SHEETS OF SELECTED SIZE |
| 1 | 0 | 1 | NO. OF SHEETS EXCEEDS CAPACITY OF INTERMEDIATE TRAY IN DUPLEX UNIT MODE |
| 1 | 1 | 0 | NO. OF SHEETS EXCEEDS TOTAL NUMBER OF BINS IN SORT MODE |
| 1 | 1 | 1 | AT LEAST ONE DESIGNATED PRINTER NOT AVAILABLE (IN ONLY ALL PRINTER OPERATION MODE) |

TABLE 20

| Command | Status |
|---|---|
| EEC 23  MCU  NO. OF RE-FEEDING | |
| 1ST BYTE | |
| 1 1 1 0 1 1 1 1 | 0 X X X X X X P |
| | NO.: LOWER 6 BITS  PARITY BIT |
| 2ND BYTE | |
| 0 0 0 0 0 0 0 1 | 0 X X X X X X P |
| | NO.: UPPER 6 BITS |

TABLE 21

| | Display Content | 19-1 Table code |
|---|---|---|
| C90 | PRINTER MISCONNECTION | 0 0 0 0 1 |
| C91 | PRINTER SWITCHED OFF | 0 0 0 1 0 |
| C08 | PRINTER IS BUSY | 0 0 0 1 1 |
| E000 | SWITCH POWER OFF, THEN ON | 0 0 1 0 0 |
| E100 | SWITCH POWER OFF, THEN ON | 0 0 1 0 1 |
| E110 | SWITCH POWER OFF, THEN ON | 0 0 1 1 0 |
| E120 | SWITCH POWER OFF, THEN ON | 0 0 1 1 1 |
| E010 | SWITCH POWER OFF, THEN ON | 0 1 0 0 0 |
| E030 | SWITCH POWER OFF, THEN ON | 0 1 0 0 1 |
| E050 | SWITCH POWER OFF, THEN ON | 0 1 0 1 0 |
| E500 | SWITCH POWER OFF, THEN ON | 0 1 0 1 1 |
| C96 | MISPRINT | 0 1 1 0 0 |
| C61 | CHECK COPIES FOR MULTI-FEED | 0 1 1 0 1 |
| J01 | PRINTER JAM | 0 1 1 1 0 |
| J04 | SORTER JAM | 0 1 1 1 1 |
| J05 | PRINT/SORTER JAM | 1 0 0 0 0 |
| C43 | SUPPLY NEW TONER | 1 0 0 0 1 |
| C42 | REMOVE THE WASTE TONER | 1 0 0 1 0 |
| C97 | CLOSE PRINTER DOOR | 1 0 0 1 1 |
| C44 | CLOSE DEVELOPER DOOR | 1 0 1 0 0 |
| C41 | CHECK DEV UNIT POSITION | 1 0 1 0 1 |
| C66 | CLOSE DUPLEX UNIT DOOR | 1 0 1 1 0 |
| C80 | CONNECT SORTER TO PRINTER | 1 0 1 1 1 |
| C94 | PRINTER IS NOT READY | 1 1 0 0 0 |
| C40 | SUPPLY PAPER | 1 1 0 0 1 |
| C60 | CLEAR PAPER FROM DUPLEX TRAY | 1 1 0 1 0 |
| C55 | NO PAPER OF SELECTED SIZE | 1 1 0 1 1 |
| C05 | DUPLEX UNIT IS NOT AVAILABLE | 1 1 1 0 0 |
| C02 | SORTER IS NOT AVAILABLE | 1 1 1 0 1 |
| C99 | PRINTER DOWN | 1 1 1 1 1 |

TABLE 22

| | Display content | 19-2 Table code |
|---|---|---|
| C92 | NO PRINTER IS AVAILABLE | 0 0 1 |
| C69 | NO DUPLEX UNIT IS AVAILABLE | 0 1 0 |
| C89 | NO SORTER IS AVAILABLE | 0 1 1 |
| C55 | NO PAPER OF SELECTED SIZE | 1 0 0 |
| C62 | INSUFFICIENT DUPLEX CAPACITY | 1 1 0 |
| C83 | INSUFFICIENT SORTER CAPACITY | 1 1 0 |
| H10 | START OR CHECK "#" "ETC" | 1 1 1 |

What we claim is:

1. An image processing system comprising:
    means for supplying an image signal;
    a plurality of image forming means for forming images in accordance with the image signal from said supplying means;
    means for inputting a number of images to be formed;
    means for setting an image formation mode for forming images on both sides of a recording medium;
    means for selecting at least one of said image forming means having a two-sided copy function for image formation in accordance with the mode set by said setting means; and
    means for discriminating as to whether or not the selected image forming means having a two-sided copy function is or are capable of forming a number of images equal to the inputted number of images.

2. An image processing system comprising:
    means for supplying an image signal;
    a plurality of image forming means for forming images in accordance with the image signal from said supplying means, at least one of said image forming means having a sorting function;
    means for inputting a number of images to be formed;
    means for setting an image formation mode for sorting a plurality of recording media;
    means for selecting at least one of said image forming means having a sorting function for image formation in accordance with the mode by said setting means; and
    means for discriminating as to whether or not the selected image forming means having a sorting function is or are capable of forming a number of images equal to the inputted number of images.

3. A system according to claim 1 or 2, wherein said supplying means has reading means for photoelectrically reading an original image and for outputting the image signal.

4. A system according to claim 1 or 2, wherein image formation is inhibited when said discriminating means had discriminated that the inputter number of images cannot be formed by the selected image forming means.

5. A system according to claim 1 or 2, wherein image formations equal in number to the inputted number are performed by said plurality of image forming means when said selecting means selects said plurality of image forming means.

6. A system according to claim 1 or 2, further comprising means for displaying a discrimination result of said discriminating means.

7. An image processing means comprising:
    means for supplying an image signal;
    a plurality of image forming means for forming images on different recording media in accordance with the image signal from said supplying means, said plurality of image forming means each having sorting means for sorting a plurality of recording media on which images are formed;
    means for setting a number of images to be formed; and
    means for determining a number of images to be formed by each of said plurality of image forming means in accordance with a sorting capacity of said sorting means is each of said plurality of image forming means and the number of images set by said setting means when images are formed on the plurality of recording media.

8. A system according to claim 7, wherein said determining means determines the number of images to be formed by each of said image forming means in accordance with a number of bins of said sorting means of each of said plurality of image forming means.

9. A system according to claim 7, wherein said plurality of image forming means simultaneously form the images in accordance with the image signal from said supplying means.

10. A system according to claim 7, wherein image formation by all of said image forming means is not performed when the number of images set by said setting means exceeds a total sorting capacity of said sorting means in said plurality of image forming means.

11. A system according to claim 7, wherein said supplying means has reading means for photoelectrically reading an original image and for outputting the image signal.

12. An image processing system comprising:
means for supplying an image signal;
means for selecting an image formation mode from a group consisting of a first image formation mode for forming image on a single side of a recording medium and a second image formation mode for forming images on both sides of a recording medium;
a plurality of image forming means for simultaneously forming images in the selected image formation mode in accordance with the image signal from said supplying means;
first control means for, when at least one image forming means among said plurality if image forming means becomes unavailable in the course of simultaneous image formation, causing another of said pluraltiy of image forming means to form images in place of said at least one image forming means; and
second control means for allowing control by said first control means when the first image formation mode is selected by said selecting means and inhibiting the control by said first control means when the second image formation mode is selected by said selecting means.

13. A system according to claim 12, further comprising means for indicating start of control by said first control means.

14. A system according to claim 12, further comprising means for setting a desired number of images to be formed, and formation of the set number of images is performed divisionally by said plurality of image forming means.

15. A system according to claim 12, wherein said supplying means has reading means for photoelectrically reading an original image and for outputting the image signal.

16. An image processing system comprising:
means for supplying an image signal;
a plurality of image forming means for simultaneously forming images based on the image signal from said supplying means;
means for designating at least one of said image forming means to be used for image formation; and
control means for selecting image forming means in accordance with a designation of said designating means and for allowing the selected image forming means to form images;
wherein said control means is operable in either a first more or a second more when more than one of said image forming means are designated by said designating means, and wherein, in the first mode, said control means inhibits an initiation of the image formation if at least one of the image forming means among the designated image forming means is unavailable and, in the second mode, said control means allows at least one of the designated image forming means to initiate the image formation when said at least one of the image forming means among the designated image forming means is available.

17. A system according to claim 16, wherein when image formation is inhibited in the first mode, it is indicated by display means in said supplying means.

18. A system according to claim 16, wherein, when a plurality of image forming means perform the image formation in the second mode, a plurality of images are divisionally formed by the plurality of said image forming means.

19. A system according to claim 16, further comprising means for image and for setting a desired number of image formations.

20. A system according to claim 16, wherein control by said control means in the first mode is changed to control in the second mode in accordance with a predetermined instruction.

* * * * *

UNITED STATES PATENT AND TRADEMARK OFFICE
CERTIFICATE OF CORRECTION

PATENT NO. : 4,797,706
DATED : January 10, 1989
INVENTOR(S) : KIYOHISA SUGISHIMA ET AL.    Page 1 of 5

It is certified that error appears in the above-identified patent and that said Letters Patent is hereby corrected as shown below:

On the title Page:

AT [57] ABSTRACT

Line 2, "multi input/multi output unit," should read --multi-input/multi-output unit,--.
    Line 5, "multi input/multi output unit," should read --multi-input/multi-out unit,--.

COLUMN 2

Line 15, "imates" should read --images--.
    Line 44, "ia" should read --is--.
    Line 50, "FIGS. 4()" should read --FIGS. 4(A)--.

COLUMN 3

Line 47, "each printer" should read --printer 11.--.

COLUMN 5

Line 52, "uoward" should read --upward--.
    Line 54, "sorting." should read --sorting.)--.
    Line 56, "non-sortmmode" should read --non-sort mode--.

COLUMN 6

Line 64, "eelect" should read --select--.
    Line 68, "send" should read --sent--.

UNITED STATES PATENT AND TRADEMARK OFFICE
CERTIFICATE OF CORRECTION

PATENT NO. : 4,797,706
DATED : January 10, 1989
INVENTOR(S) : KIYOHISA SUGISHIMA ET AL.    Page 2 of 5

It is certified that error appears in the above-identified patent and that said Letters Patent is hereby corrected as shown below:

COLUMN 8

Line 8, "Unneessary" should read --Unnecessary--.
Line 51, "master between" should read
         --master, as between--.
Line 52, "a master between" should read
         --a master, as between--.

COLUMN 9

Line 32, "eceived" should read --received--.

COLUMN 10

Line 48, "received" should read --is received--
         and "recieved" should read --received--.

COLUMN 11

Line 19, "respective" should read --respectively--.
Line 34, "recognized" should read --is recognized--.

COLUMN 12

Line 34, "(S13-17)" should read --(S13-17).--.
Line 49, "tther" should read --other--.
Line 66, "must" should read --must be--.

COLUMN 13

Line 57, "ss" should read --is--.

UNITED STATES PATENT AND TRADEMARK OFFICE
CERTIFICATE OF CORRECTION

PATENT NO. : 4,797,706
DATED : January 10, 1989
INVENTOR(S) : KIYOHISA SUGISHIMA ET AL.   Page 3 of 5

It is certified that error appears in the above-identified patent and that said Letters Patent is hereby corrected as shown below:

COLUMN 15

Line 18, "available., printers)" should read
--available printers)--.
Line 19, "if," should read --if--.
Line 37, "the" should read --that the--.
Line 54, "'in copying' flags" should read
--"in copying" flages--.

COLUMN 16

Lines 51-52, "MULTI". ¶ When" should read
--MULTI". When--.

COLUMN 17

Line 34, "this" should read --thus--.
Line 64, "1 deck:" should read --①  deck:--.
Line 65, "2 lower" should read --② lower--
and "3 upper" should read --③ upper--
and "4 auto-" should read --④ auto- --.
Line 66, "1 deck:" should read --① deck--.

UNITED STATES PATENT AND TRADEMARK OFFICE
CERTIFICATE OF CORRECTION

PATENT NO. : 4,797,706

DATED : January 10, 1989

INVENTOR(S) : KIYOHISA SUGISHIMA ET AL.          Page 4 of 5

It is certified that error appears in the above-identified patent and that said Letters Patent is hereby corrected as shown below:

COLUMN 18

Line 2, "1 to 4" should read --①  to ④--.
Line 3, "state 1 in" should read --state ① in--.
Line 26, "FIG. 15-2 1 ," should read --FIG. 15-2 ①,--.
Line 28, "FIG. 15-2 2 ." should read --FIG. 15-2 ②.--.
Line 29, "FIG. 15-2 2 ," should read --FIG. 15-2 ②,--.
Line 31, "FIG. 15-2 3 ." should read --FIG. 15-2 ③.--.
Line 32, "FIG. 15-2 3 ," should read --FIG. 15-2 ③,--.
Line 34, "FIG. 15-2 4 ." should read --FIG. 15-2 ④.--.
Line 35, "FIG. 15-2 4 ," should read --FIG. 15-2 ④,--.
Line 37, "FIG. 15-2 5 ." should read --FIG. 15-2 ⑤.--.
Line 40, " 1. " should read --①.--.

COLUMN 19

Line 51, "of," should read --of--.

COLUMN 23

Line 1, "allthe" should read --all the--.

COLUMN 25

Line 1, "aplurality" should read --a plurality--.

COLUMN 31

Table 19-1, "PEITIER ERROR" should read --PELTIER ERROR--.

UNITED STATES PATENT AND TRADEMARK OFFICE
CERTIFICATE OF CORRECTION

PATENT NO. : 4,797,706
DATED : January 10, 1989
INVENTOR(S) : KIYOHISA SUGISHIMA ET AL.    Page 5 of 5

It is certified that error appears in the above-identified patent and that said Letters Patent is hereby corrected as shown below:

COLUMN 32

Table 19-1-continued, "DEVELOPPING" should read --DEVELOPING-- both occurrences.

COLUMN 34

Line 28, "by" should read --set by--.
    Line 40, "had" should read --has-- and "inputter" should read --imputted--.

COLUMN 35

Line 30, "if" should read --of--.
    Line 33, "pluraltiy" should read --plurality--.

COLUMN 36

Line 19, "more" should read --mode-- first two occurrences.
    Line 40, "for image and" should be deleted.

Signed and Sealed this

Third Day of April, 1990

*Attest:*

HARRY F. MANBECK, JR.

*Attesting Officer*    *Commissioner of Patents and Trademarks*